US006925878B2

(12) United States Patent
Baba et al.

(10) Patent No.: US 6,925,878 B2
(45) Date of Patent: Aug. 9, 2005

(54) ACCELERATION SENSOR

(75) Inventors: Hiroyuki Baba, Kawasaki (JP); Hideki Matsumoto, Setagaya-ku (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/909,859

(22) Filed: Aug. 2, 2004

(65) Prior Publication Data

US 2005/0000288 A1 Jan. 6, 2005

Related U.S. Application Data

(62) Division of application No. 10/619,269, filed on Jul. 14, 2003, now Pat. No. 6,779,403, which is a division of application No. 09/874,703, filed on Jun. 5, 2001, now Pat. No. 6,622,559.

(30) Foreign Application Priority Data

| Jun. 5, 2000 | (JP) | 2000-167403 |
| Oct. 6, 2000 | (JP) | 2000-307356 |
| Jan. 23, 2001 | (JP) | 2001-014702 |

(51) Int. Cl.[7] .............................................. G01L 11/08
(52) U.S. Cl. .................................. 73/514.34; 73/35.11
(58) Field of Search ............................ 73/514.34, 35.11, 73/654, 514.16, 514.29; 310/329, 346, 324

(56) References Cited

U.S. PATENT DOCUMENTS

| 4,190,782 A | 2/1980 | Guess ........................ 310/324 |
| 4,371,804 A | 2/1983 | Peng et al. |
| 4,374,472 A | 2/1983 | Nishimura .................. 73/35.11 |
| 4,382,377 A | 5/1983 | Kleinschmidt et al. ..... 73/35.11 |
| 4,660,410 A | 4/1987 | Asano et al. ............... 73/35.11 |
| 4,924,131 A | 5/1990 | Nakayama et al. .......... 310/329 |
| 4,984,498 A | 1/1991 | Fishman |
| 5,226,325 A | 7/1993 | Komurasaki et al. ........ 310/329 |
| 5,679,897 A * | 10/1997 | Matsumoto et al. ...... 73/514.34 |
| 6,769,305 B2 * | 8/2004 | Baba et al. .............. 73/514.34 |

FOREIGN PATENT DOCUMENTS

| DE | 84 16 880.3 | 9/1984 |
| JP | 2-74868 | 3/1980 |

OTHER PUBLICATIONS

Patent Abstracts of Japan, vol. 1997, No. 03, Mar. 31, 1997 & JP 08 292088 A (Nippondenso Co Ltd), Nov. 5, 1996, abstract.
Patent Abstracts of Japan, vol. 008, No. 215 (P–305), Oct. 2, 1984& JP 59 099323 A (Nippon Jidosha Buhin Sogo Kenkyusho KK), Jun. 8, 1984, abstract; figures 5 and 6.
Patent Abstracts of Japan, vol. 010, No. 135 (P–457), May 20, 1986 & JP 60 256017 A (Matsushita Denki Sangyo KK), Dec. 17, 1985, abstract.

* cited by examiner

Primary Examiner—Helen Kwok
(74) Attorney, Agent, or Firm—Pearne & Gordon LLP

(57) ABSTRACT

An acceleration sensor comprises a fixed case member and a cover assembly collectively defining a closed space in which the oscillation plate and the piezoelectric element received therein. The oscillation plate and the piezoelectric element are oscillatably supported by a supporting portion formed on the central bottom portion of the fixed case member. The oscillation plate and the piezoelectric element are integrally oscillatable in two different modes consisting of: a 1/1 oscillation mode where the oscillation plate is irregularly deformed to have the peripheral portion oscillated with a single vector in the oscillation direction of the oscillation plate when the oscillation plate is oscillated with respect to the fixed case member at a resonance frequency $f_0$; and a 1/2 oscillation mode where the oscillation plate is irregularly deformed to have two different half parts of the peripheral portion oscillated with their respective different vectors opposite to each other in the oscillation direction of the oscillation plate when the oscillation plate is oscillated with respect to the fixed case member at a noise frequency $f_01$, and the resonance frequency $f_0$ and the noise frequency $f_01$ are out of the range of effective oscillation frequencies. Thus constructed acceleration sensor is of high performance and appropriate for automatic production at a low cost.

11 Claims, 31 Drawing Sheets

F I G. 2
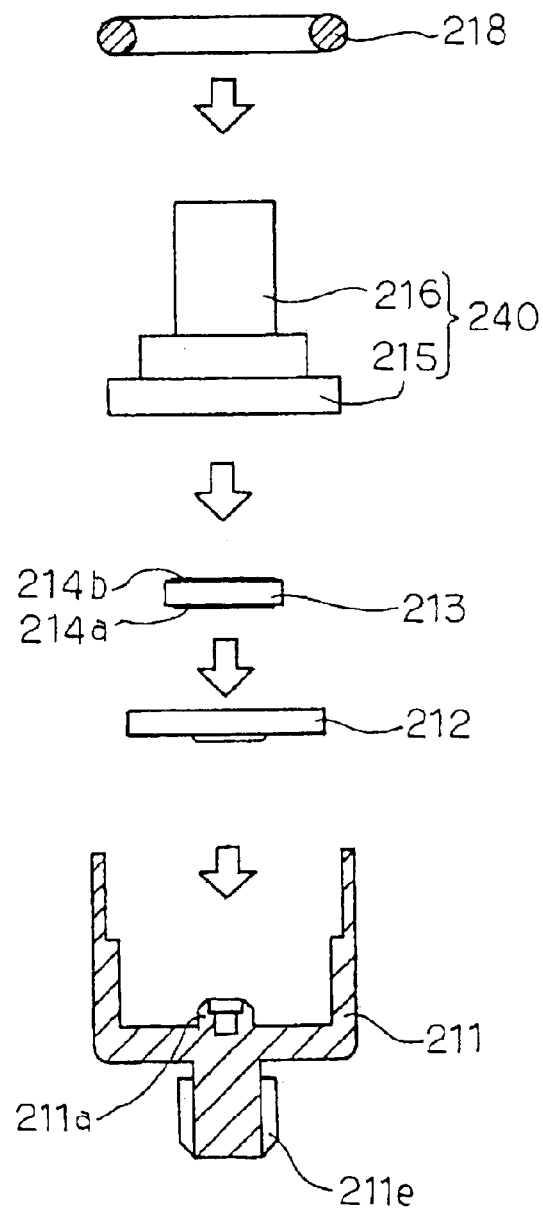

F I G. 6

| Constants<br>Material | E: Young's modules (N/m²) | ρ: Density (kg/m³) | σ: Poisson's ratio |
|---|---|---|---|
| Oscillation Plate (Nickel Steel) | $2 \times 10^{11}$ | $7.8 \times 10^3$ | 0.28 |
| Piezoelectric Element (PZT) | $6.3 \times 10^{10}$ | $7.65 \times 10^3$ | 0.34 |

Relationship between Thickness $t_1$ and Sensitivity $V_0$ /Resonance Frequency $f_0$ Relationship between Thickness $t_1$ and Sensitivity $V_0$ /Resonance Frequency $f_0$ Relationship between Proportion of $R_2/R_1$ and Resonance Frequency $f_0$ Relationship between Proportion of $R_2/R_1$ and Resonance Frequency $f_0$ Relationship between Proportion of $R_2/R_1$ and Sensitivity $V_0$(mV)/ Resonance Frequency $f_0$ (kHz)

F I G. 1 3
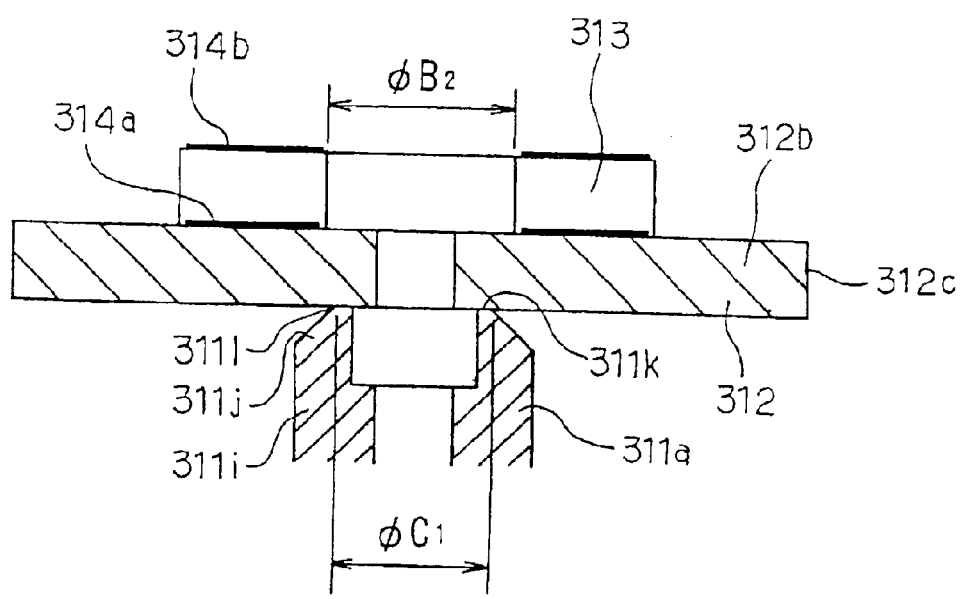

F I G. 1 4

Relationship between Sensitivity Vo /Resonance Frequency fo,
Inner Diameter of Piezoelectric Element, i.e.,B2(mm)
with respect to Diameter of Supporting Portion, i.e.,C1(mm)

| φA2/φB2 | | φ13/φ4.9 t2=2 | | φ13/φ3.1 t2=2 | |
|---|---|---|---|---|---|
| φC1 | | 2 | 3 | 2 | 3 |
| φ4.3 | Vo | 26.1 | 23.7 | 22.8 | 22.4 |
| | fo | 21.0 | 23.5 | 21.5 | 23.8 |
| φ5.7 | Vo | 22.1 | 18.0 | 19.9 | 18.2 |
| | fo | 23.0 | 25.3 | 23.3 | 23.3 |

Outer Diameter of Oscillation Body φA1=22(mm)  Vo:(mV)  fo:(kHz)

FIG. 15

Relationship between Sensitivity Vo /Resonance Frequency fo, and Proportion of Thickness of Oscillation Plate $t_1$ with respect to Thickness of Piezoelectric Element $t_2$

| $\phi C_1$ | | $t_1/t_2$ | 0.67 | 1 | 1.25 | 1.5 | 2 | 3 |
|---|---|---|---|---|---|---|---|---|
| $\phi 4.3$ | $t_1=2$ | Vo | 20.7 | 22.8 | 22.5 | | 22.7 | |
| | | fo | 21.8 | 21.5 | 21.0 | | 19.0 | |
| | $t_1=3$ | Vo | | 21.9 | | 22.4 | | 19.8 |
| | | fo | | 24.3 | | 23.8 | | 22.5 |

Outer Diameter of Piezoelectric Element $\phi A_2=13$(mm) Vo:(mV) fo:(kHz)

FIG. 17
Result of Experiments

| φA1 \ φC1 \ φC1/R1 \ φA2 | | | φ12 | φ13 | φ14 | φ15 | φ16 |
|---|---|---|---|---|---|---|---|
| φ20 | φ4.2 | 0.55 | × 0.39 | | | | |
| φ20 | φ5.7 | 0.80 | × 0.47 | × 0.46 | × 0.37 | | |
| φ20 | φ6.3 | 0.92 | ○ ≥0.57 | ○ ≥0.55 | × 0.46 | | |
| φ20 | φ7.3 | 1.15 | | ○ ≥0.53 | ○ ≥0.53 | ○ ≥0.53 | |
| φ22 | φ7.3 | 0.99 | | | × 0.51 | × 0.49 | |
| φ22 | φ8.7 | 1.31 | | | ○ ≥0.53 | ○ ≥0.52 | ○ ≥0.52 |

- t1=t2=2(mm)
- ○(Pass): Spurious was not recognized
- ×(Fail): Spurious was recognized
- ○/×(Pass/fail) was judged at an upper limit frequency of the range of effective frequencies, i.e., 15(kHz).
- Values stated below ○ or × : $f_{01}/f_0$

F I G. 1 8
Result of Experiments
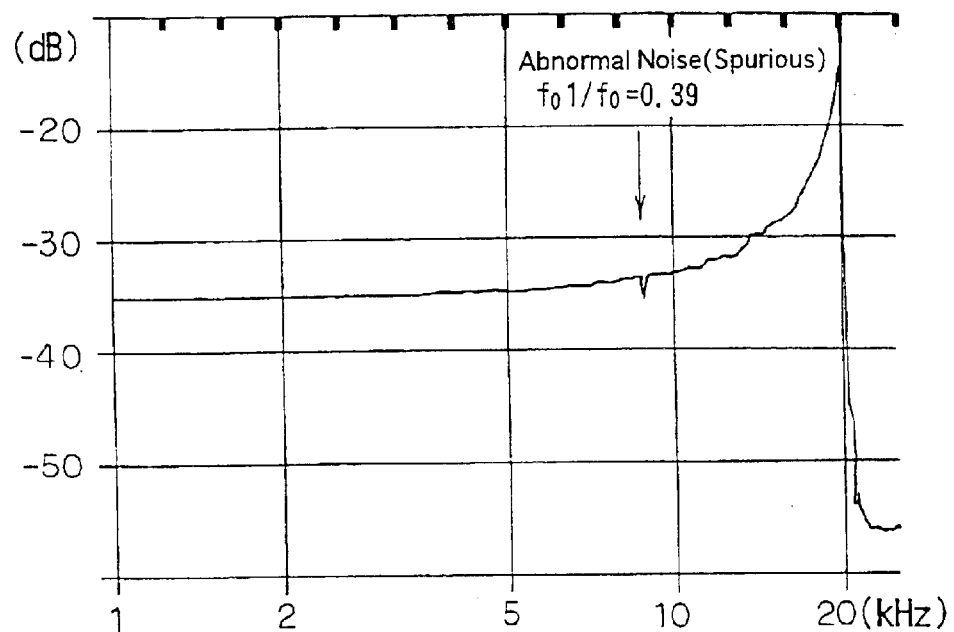
$\phi C_1 = 4.2$
$\phi C_1 / R_1 = 0.55$
$f_0 = 23 (kHz)$ Result of Experiments $\phi C_1 = 5.7$ $\phi C_1 / R_1 = 0.80$ $f_0 = 26.3 (kHz)$ Result of Experiments $\phi C_1 = 6.3$ $\phi C_1 / R_1 = 0.92$ $f_0 = 27.3 (kHz)$ Result of Experiments $\phi C_1 = 7.3$ $\phi C_1/R_1 = 1.15$ $f_0 = 30.3 \text{(kHz)}$ Relationship between frequency f and output voltage V 1/1 Oscillation Mode 1/2 Oscillation Mode 1/4 Oscillation Mode

ACCELERATION SENSOR

CROSS-REFERENCE TO RELATED APPLICATION

The present application is a division of application Ser. No. 10/619,269 filed Jul. 14, 2003 now U.S. Pat. No. 6,779,403, which is a division of application Ser. No. 09/874,703 filed Jun. 5, 2001, now U.S. Pat. No. 6,622,559.

BACKGROUND OF THE INVENTION

1. Field of the Invention

The present invention relates to an acceleration sensor, and more particularly to an acceleration sensor for detecting an acceleration by transforming oscillation levels into electrical signals.

2. Description of the Related Art

In general, the acceleration sensor now in use includes various types such as an electro magnetic type, a piezoelectric element type, and a semiconductor type which are known as detecting an acceleration applied thereto. Among these types of acceleration sensor, the piezoelectric element type of the acceleration sensor has a piezoelectric element deformable in response to the acceleration to detect the acceleration. These piezoelectric element types of the acceleration sensor are applied to automotive vehicles and used for controlling knocking of engine and air bag.

A conventional piezoelectric element type of the acceleration sensor herein raised for example is shown in FIG. 25 to comprise an oscillation plate having a central portion fixed. This type is called "the center-fixed type of acceleration sensor", i.e., the first conventional acceleration sensor. This center-fixed type of acceleration sensor 100 comprises a fixed metal case 101 having a central bottom portion from which projects a supporting protrusion 101a integrally formed with the central portion. Onto the supporting protrusion 101a is welded and securely connected an oscillation plate 102 made of a metal and in the form of a thin disc shape to facilitate resonance motion of the oscillation plate 102 as shown in FIG. 26. On the upper surface of the oscillation plate 102 is mounted a piezoelectric element 103 in a doughnut shape in a manner that the piezoelectric element 103 is held in axial alignment with the oscillation plate 102. The piezoelectric element 103 has upper and lower surfaces on which are respectively mounted a pair of electrodes 104 axially aligned with the piezoelectric element 103. One of the electrodes 104 is electrically connected with the oscillation plate 102, while the other one of the electrodes 104 is soldered at 105a and thus electrically connected with a metal wire 105 by way of, for instance, wire bonding. The acceleration sensor 100 further comprises an output terminal 107 having one end electrically connected with the metal wire 105 and the other end electrically connected with an exterior connector, not shown, and a cover member 106 in the form of a bowl shape and made of a resin material. The fixed case 101 and the cover member 106 have peripheral edge portions 101c and 106c, respectively, which are firmly coupled with each other to define a closed space 109 having the oscillation plate 102 and the piezoelectric element 103 received therein. Between the peripheral edge portions 101c of the fixed case 101 and 106c of the cover member 106 is disposed an O-ring which serves to hermetically seal the closed space 109.

Another conventional piezoelectric element type of the acceleration sensor herein raised for example, i.e., the second conventional acceleration sensor is shown in FIG. 27.

The acceleration sensor 110 comprises a fixed case 111 made of a metal and having a peripheral ledge portion 111c, and a metal base member 112 in the form of a disc shape and also having a peripheral edge portion 112c. The metal base member 112 is welded to and thus securely mounted on the fixed case 111 with the peripheral ledge portion 111c being in registry with the peripheral edge portion 112c so that the fixed case 111 is covered and closed by the metal base member 112. On the metal base member 112 is mounted a connector member 116 also in the form of a disc shape and having a peripheral edge portion 116c fixedly engaged with the peripheral ledge portion 111c of the fixed case 111. The connector member 116 has an output terminal 107 securely mounted thereon and is electrically connected with an exterior connector, not shown. The fixed case 111, the metal base member 112 and the connector member 116 collectively define a closed space 109 in which the oscillation plate 102 and the piezoelectric element 103 are accommodated. The metal base member 112 has a central portion from which downwardly extends a protrusion 112a having the oscillation plate 102 supported thereon, compared with the protrusion 101a of the case base 101 upwardly projected and having the oscillation plate 102 supported thereon as shown in FIG. 25. Both of the oscillation plate 102 and the piezoelectric element 103 are in the form of a doughnut shape and securely supported by the protrusion 112a of the metal base member 112 to ensure that the oscillation plate 102 is oscillatable with respect to the fixed case 111. The connector member 116 is made of a resin material and serves to electrically insulate the metal base member 112 from the fixed case 111. The output terminal 107 securely mounted on the connector member 116 extends through the protrusion 112a of the metal base member 112 and has a lower end electrically connected with one of the electrodes 104 on the piezoelectric element 103 by way of a connecting disc plate 115 soldered at 115a to the lower end of the output terminal 107 and one of the electrode 104. The acceleration sensor 110 comprises an O-ring 118 disposed between the inner peripheral face of the fixed case 111 and the outer peripheral face of the metal base member 112 to hermetically seal the closed space 109. It is preferable that the connecting disc plate 115 has a rigidity as small as possible so that the oscillation plate 102 and the piezoelectric element 103 are not prevented from being oscillated. The connecting disc plate 115 may be replaced with a metal wire having one end electrically connected to the output terminal 107 and the other end electrically connected to one of the electrode 104 on the piezoelectric element 103 in a manner that the oscillation plate 102 is welded on the protrusion 112a of the metal base member 112.

The first and second conventional acceleration sensors 100 and 110 respectively have lower portions formed with male screws 101b and 111b each screwed in to an oscillation object such as an automotive engine or the like to ensure that the oscillation plate 102 is oscillated with respect to the fixed cases 101 and 111 when the oscillation object is oscillated for some reason. The oscillation of the oscillation plate 102 causes the piezoelectric elements 103 to be deformed and energized to generate voltage levels which are outputted to the output terminal 107 through one of the electrodes 104 with the fixed case 101 or 111 and the metal base member 112 grounded.

In general, the piezoelectric element 103 has a capacity C between the electrodes 104 which can produce an electric charge Q when the oscillation plate 102 is oscillated and deformed to produce a stress deformation in the piezoelectric element 103 by exterior oscillations, i.e. accelerations.

The electric charge Q thus caused by the stress deformation of the oscillation plate 102 can be measured as voltage V that is represented by the following equation:

$$V=Q/C$$

It is considered that the oscillation plate 102 has the maximum oscillation amplitude at around its outer peripheral end while the piezoelectric element 103 has the maximum stress deformation value at around its central portion, resulting from the fact that the piezoelectric element 103 is extended and contracted.

The acceleration sensor 100 or 110 has a frequency characteristic under a predetermined level of oscillation corresponding to a predetermined level of acceleration as shown in FIG. 28. FIG. 28 indicates that the output voltage $V_0$ is high at a frequency of the resonance point $f_0$, hereinlater referred to as "resonance frequency $f_0$", while being flat and low at frequency points in other areas such as medium and low frequency areas. In view of this frequency characteristic, acceleration sensors such as the acceleration sensors 100 and 110 are classified into two different types consisting of a non-resonance type of using a flat portion of the frequency characteristics within a predetermined range of effective frequencies which does not include the resonance frequency $f_0$ and a resonance type of using frequency characteristics having the resonance frequency $f_0$ within a predetermined range of effective frequencies. The acceleration sensors 100 and 110 are adapted to operate with the oscillation plate 102 oscillated at a desired frequency level within a predetermined range of effective frequencies having the upper limit in the vicinity of the resonance frequency $f_0$.

The resonance frequency $f_0$ of the oscillation plate 102 in the form of a disc shape and securely mounted on the central portion of the fixed case can be represented by the following equation (1).
[Eq. 1]

$$f_o=\alpha(t/R^2)\times\sqrt{E/\rho(1-\sigma^2)} \quad \text{equation (1)}$$

where $\alpha=0.172$ (constant), t stands for thickness, R stands for radius, E stands for Young's modulus, $\rho$ stands for density, and $\sigma$ stands for Poisson's ratio.

In the event that the oscillation plate 102 is made of nickel steel, the above parameters are as follows.

$t=0.4$ (mm), $R=7$ (mm), $E=2\times10^{11}$ (N/m$^2$), $\rho=7.8\times10^3$ (kg/m$^3$),
and $\sigma=0.28$.

The above parameters render the resonance frequency $f_0$ to be 7.41 (kHz). The resonance frequency $f_0$ is determined primarily by the oscillation plate 102, however, should be decided in consideration of other neighboring elements such as the fixed case 101 and piezoelectric element 103. This is because of the fact that those elements slightly affect the oscillation of the oscillation plate 102.

In order to secure a desired resonance frequency $f_0$ in view of the above fact, the thickness t and the radius R are, in general, required to be appropriately selected for designing the acceleration sensor. In particular, the resonance frequency $f_0$ is affected largely by the radius R as will be seen from the fact based on experimental results that the resonance frequency $f_0$ is varied by a rate of about 1 to 2% as the radius R of the oscillation plate 102 is varied by 0.1 mm with the thickness t unchanged. In the light of the sensitivity of the acceleration sensor, it is evident through repeated experiments that the acceleration sensor 110 shown in FIG. 27 can be produced with sensitivity higher than that of the acceleration sensor 100 shown in FIG. 25. The reason is considered to be due to the fact that the oscillation plate 102 is mounted on the metal base member 112, with the result that the metal base member 112 being not completely rigid is slightly oscillated together with the oscillation plate 102 when it receives acceleration, thereby making it possible for the oscillation of the oscillation plate 102 to be amplified by the metal base member 112.

The electrodes 104 mounted on the piezoelectric element 103 may be categorized into two different groups consisting of a first group of excitation electrodes which is constituted by a pair of electrodes with a small diameter and a second group of detection electrodes which is constituted by a pair of electrodes with a large diameter, and both the first group of the exciting electrodes and the second group of the detection electrodes are coaxially aligned with the piezoelectric element 103. Alternating current is applied to the piezoelectric element 103 through the excitation electrodes thus constructed so as to oscillate the oscillation plate 102 by way of the piezoelectric effect, and energize the detection electrodes, thereby making it possible to measure output voltage through the detection electrodes for carrying out the self diagnostics such as performance and failure diagnostics, or the calibration of the acceleration sensor. In the conventional acceleration sensors 100 and 110, the oscillation plate 102 is supported by the supporting protrusion 101a and the protrusion 112a, respectively. There are, however, provided many variations of the acceleration sensor. The oscillation plate may be in the form of a disc shape having a peripheral portion clamped, or in the form of a rod having one end securely mounted. The fixed cases 101 and 111 are classified into two types consisting of one-terminal type of having the fixed case serve as a ground and two-terminal type having two terminals, one of which serves as a ground.

FIG. 29 shows a third conventional acceleration sensor 120 of the piezoelectric element type and the non-resonance type comprising a piezoelectric element and a weight. This type is called "the compression type of the acceleration sensor". The acceleration sensor 120 comprises a connector body 126 and a fixed case 121. The connector body 126 has a peripheral edge portion. The fixed case 121 is made of a metal material and has an open peripheral end portion 121c which is bent to form a fitting portion fittingly connected with the peripheral edge portion of the connector body 126 to define a closed space 109 having a weight 122 and a piezoelectric element 123 received therein. The connector body 126 has a terminal 107 mounted thereon. The piezoelectric element 123 is in the form of a doughnut shape and has upper and lower surfaces on which are respectively mounted a pair of detection electrodes 124 consisting of a first electrode and a second electrode 124a and 124b. The weight 122 is made of a metal material and in the form of a cylindrical shape. The weight 122 is held in contact with the first detection electrodes 124a on the upper surface of the piezoelectric element 123 as shown in FIG. 30. The terminal 107 is adapted to be electrically connected to the first electrode 124a of the piezoelectric element 123 and an exterior connector, not shown. The weight 122 is securely mounted on the piezoelectric element 123 by means of a fastening screw 125 to pressurize the piezoelectric element 123 toward the center bottom portion of the fixed case member 121. The fastening screw 125 is screwed in through a screw hole 121d formed in the center bottom portion of the fixed case 121.

The second detection electrodes 124b forming part of the acceleration sensor 120 is mounted on the lower surface of the piezoelectric element 123 to be electrically connected with the fixed case 121 while the first detection electrodes 124a is mounted on the upper surface of the piezoelectric element 123 to be electrically connected with the weight 122 and a contact terminal 127. The contact terminal 127 is in the form of a L-shape and securely mounted on the weight 122 by the fastening screw 125. The contact terminal 127 is electrically connected with the output terminal 107 of the connector body 126 through a wire 129 having both ends 129a and 129b soldered with the contact terminal 127 and the output terminal 107, respectively. The acceleration sensor 120 further comprises an insulation tube 125a and an insulation spacer 125b interposed between the weight 122, the piezoelectric element 123, and the fastening screw 125 to prevent the fixed case 121 and the output terminal 107 from forming a short circuit. The acceleration sensor 120 further comprises an O-ring 128 disposed between the open peripheral end portion 121c of the fixed case 121 and the peripheral end portion of the connector body 126 to hermetically seal the closed space 109 in which electrical components such as the piezoelectric element 123 are accommodated.

The acceleration sensor 120 thus constructed makes it possible to use the fixed case 121 as a ground for an electric circuit, and output an output voltage of the piezoelectric element 123 through the weight 122 and the output terminal 107. The fixed case 121 has a bottom portion formed with a male screw 121b fixed to an exterior object such as an engine, not shown, to be detected for an acceleration. An oscillation caused by the exterior object is transmitted to the weight 122, which exerts a load (compression force) on the piezoelectric element 123 in response. The piezoelectric element 123 generates an output voltage indicative of the acceleration and outputs the output voltage through the output terminal 107. The acceleration is thus detected on the basis of the output voltage received from the output terminal 107. The acceleration sensor 120 has a frequency characteristic similar to that of the aforesaid acceleration sensors 100 and 110 under a predetermined constant level of oscillation, i.e., constant acceleration as shown in FIG. 28. The resonance frequency $f_0$, however, does not appear to a recognizable extent depending upon the condition of the acceleration sensor assembled with other devices and machines. This results from the fact that the resonance frequency $f_0$ moves to a higher frequency range due to the fact the fastening screw 125 is screwed in through the central portion of the piezoelectric element 123 and the weight 122 with a relatively small screwing force exerted on the peripheral portion of the acceleration sensor 120, thereby causing the acceleration sensor 120 to be resonantly oscillated in a high frequency range. This means that the fastening screw 125 is required to be produced with high precisions for torque and machining of the engagement faces of the fastening screw 125.

The acceleration sensor 120 of such non-resonance frequency type is usually designed to be oscillatable with the resonance frequency $f_0$ of 20 kHz or greater, which is out of the range of effective oscillation frequencies, so that the flat portion, i.e., $V_0$ of the output voltage range is actually used for detecting an acceleration (see FIG. 28). $V_0$ also stands for "the sensitivity" of the acceleration sensor. The basic principle of the acceleration sensor 120 is that an acceleration [G] exerted on a weight 122 of mass [m] causes a stress strain [F] on the piezoelectric element 123 to generate an output voltage $V_0$ indicative of the acceleration in accordance with the equation as follows.

$$F = m \cdot G$$

$$V_0 = \alpha \cdot F \cdot t / S$$

where α stands for a constant such as piezoelectric constant, S stands for the area of the detecting electrode 124 of the piezoelectric element 123, and t stands for the thickness of the piezoelectric element 123.

As will be understood from the foregoing description, the methods to enhance the sensitivity of the acceleration sensor 120 is considered to include:

(1) an increased weight of the weight 122, and/or
(2) an increased factor "t/S" of the piezoelectric element 123. (The increase in the factor "t/S", however, is limited to a predetermined level decided based on its size and volume requested.)

It is therefore understood that the size, especially, the height of the acceleration sensor is required to be enlarged in order to enhance the sensitivity.

The acceleration sensor 120 may comprise a gold plated connecting terminal in place of a lead line such as the wire 129 having the output terminal 107 electrically connected with the weight 122 (the contact terminal 127). The acceleration sensor 120 is not limited to the one-terminal type of having the fixed case 121 serve as a ground but also includes the two-terminal type having two terminals, one of which serves as a ground. The electrodes 124a and 124b of the piezoelectric element 123 may be divided into two groups consisting of the first group of electrodes serving for detecting an acceleration and the second group of electrodes serving for performing the self diagnostics or calibration.

As will be seen from the forgoing description, the first conventional acceleration sensor 100, however, encounters such problems that it is difficult to automatically assemble the acceleration sensor 100 resulting from the fact that one of the electrodes 104 of the piezoelectric element 103 is required to be electrically connected with the output terminal 107 of the cover member 106 through the wire 105 having both ends soldered with them, respectively, by way of, for instance, wire bonding. This leads to the fact that the production cost of the acceleration sensor 100 rises.

As will be seen from the foregoing description, the second conventional acceleration sensor 110 requires no wire connections, thus makes it possible to automatically assemble the acceleration sensor 110 and improve the sensitivity in comparison with the first conventional acceleration sensor 100. The second conventional acceleration sensor 110, however, encounters another problem that oscillation in a high frequency range beyond 10 kHz is easily transmitted through constitutional parts and elements within the acceleration sensor 110 such as the fixed case 111, and the oscillation thus transmitted affects the characteristics of the acceleration sensor 110 such as phase characteristics. The second conventional acceleration sensor 110 also encounters another problem that the metal base member 112 is not perfectly rigid but could be slightly distorted and loosened due to temperature degradation resulting from the fact that the connector member 116 has a peripheral edge portion fixedly engaged with the peripheral ledge portion 111c of the fixed case 111, and a gap between the fixed case 111, the metal base member 112, and the connector member 116 is subject to vary at an elevated temperature. An oscillation noise generated from the output terminal 107 is transmitted to the connector member 116. The metal base member 112 thus distorted and loosened will transmit the oscillation noise to the oscillation plate 102, thereby deteriorating the accuracy of the acceleration sensor 110 for detecting an acceleration.

Furthermore, the first and second acceleration sensors 100 and 110 encounter another problem. As a result of an analysis by means of the finite element method, the oscillation plate of acceleration sensors of the center-fixed type such as the acceleration sensors 100 and 110 is oscillatable in three different modes consisting of a 1/1 oscillation mode, a 1/2 oscillation mode, and a 1/4 oscillation mode as shown in FIG. 31.

FIG. 31A shows the oscillation plate oscillating in the 1/1 oscillation mode where the oscillation plate is irregularly deformed to have the peripheral portion oscillated with a single vector in the oscillation direction of the oscillation plate when the oscillation plate is oscillated with respect to the fixed case member at a resonance frequency $f_0$, FIG. 31B shows the oscillating plate oscillating in the 1/2 oscillation mode where the oscillation plate is irregularly deformed to have two different half parts of the peripheral portion oscillated with their respective different vectors opposite to each other in the oscillation direction of the oscillation plate when the oscillation plate is oscillated with respect to the fixed case member at a first noise frequency $f_01$, and FIG. 31C shows the oscillating plate oscillating in the 1/4 oscillation mode where the oscillation plate is irregularly deformed to have four different parts of the peripheral portion oscillated with their respective different vectors opposite to one another in the oscillation direction of the oscillation plate when the oscillation plate is oscillated with respect to the fixed case member at a second noise frequency $f_02$. The first noise frequency $f_01$ is approximately half of the resonance frequency $f_0$, and the second noise frequency $f_02$ is in the vicinity of the resonance frequency $f_0$. The oscillation of the oscillation plate in the 1/2 or 1/4 oscillation mode does not cause any problem as long as the oscillation plate has two or four different parts of the peripheral portion evenly oscillated with respective vectors opposite to one another in the oscillation direction of he oscillation plate, and the output voltage thus generated is counterbalanced. The oscillation plate, however, could have two or four different parts of the peripheral portion unevenly oscillated with respective vectors opposite. The uneven oscillation of the oscillation plate causes the piezoelectric element to generate a noise output voltage and deteriorate the accuracy of the acceleration sensor. Especially the oscillation of the oscillation plate in the 1/2 oscillation mode causes noise output voltage, hereinlater referred to as "spurious". This leads to the fact that the oscillation of the oscillation plate at a frequency in the vicinity of the first noise frequency $f_01$ causes an error in detecting an acceleration.

The oscillation plate used for the acceleration sensor of the non-resonance type is thick. It is considered that the weight balance of the oscillation plate with respect to the support portion affects the quality of the acceleration sensor.

As will be seen from the foregoing description, the third conventional acceleration sensor 120 encounters a problem that it is difficult to automatically assemble the acceleration sensor 120, and thus the production cost of the acceleration sensor 120 rises resulting from the fact that the acceleration sensor 120 has many parts and is complex in construction. The third conventional acceleration sensor 120 also encounters another problem that the acceleration sensor 120 is required to be produced with high precision for torque and machining of the engagement faces of the fastening screw 125 resulting from the fact that the fastening screw 125 is screwed in through the central portion of the weight 122 and the piezoelectric element 123 so that the weight 122 and the piezoelectric element 123 are tightly held in contact with each other toward the bottom surface of the fixed case 121. This further leads to another problem that the size (especially, the height) of the acceleration sensor 120 is required to be enlarged and the production cost is increased.

The acceleration sensor 120, furthermore, encounters another problem that the fastening screw 125 may be loosened, thereby causing the acceleration sensor 120 to deteriorate the accuracy for detecting an acceleration.

SUMMARY OF THE INVENTION

It is therefore a primary object of the present invention to provide an acceleration sensor which is simple in construction and thus constituted by a small number of parts and elements.

It is another object of the present invention to provide an acceleration sensor which is most appropriate for automatic production of acceleration sensors.

It is a further object of the present invention to provide an acceleration sensor which is inexpensive in production cost.

It is a yet further object of the present invention to provide an acceleration sensor which is excellent in performance.

In accordance with a first aspect of the present invention, there is provided an acceleration sensor for detecting an acceleration caused by an object oscillated in an oscillation direction, comprising a sensor casing having a center axis and to be positioned in coaxial alignment with the oscillation direction to receive the acceleration, the sensor casing including a cylindrical fixed case member having a supporting portion axially extending, and a cover assembly provided on the fixed case member to cover the fixed case member to define a closed space, an oscillation plate accommodated in the closed space of the sensor casing and having a central portion supported by the supporting portion of the fixed case member, and a peripheral portion integrally formed with the central portion and extending radially outwardly of the central portion to be freely movable with respect to the supporting portion of the fixed case member, and the oscillation plate being partly oscillatable along the center axis with respect to the fixed case member; a piezoelectric element held in contact with the oscillation plate to generate a voltage indicative of the acceleration when the acceleration is exerted on the sensor casing to have the oscillation plate partly oscillated along the center axis with respect to the sensor casing with the peripheral portion of the oscillation plate being deformed, and the piezoelectric element having first and second surfaces respectively having first and second electrodes mounted thereon to have the voltage indicative of the acceleration to output therethrough; a terminal pin extending through the cover assembly and terminating at the exterior of the cover assembly, and a printed board retained by the cover assembly to have the second electrode of the piezoelectric element and the terminal pin connected with each other.

In the above acceleration sensor, the fixed case member and the oscillation plate may be each made of an electroconductive material to ensure that the first electrode is electrically connected with the oscillation plate and the fixed case member. The cover assembly comprises a metal base member made of an electroconductive material and a cover member made of an insulating material. The metal base member has a peripheral end portion welded to part of the fixed case member with the closed space defined by the metal base member and the fixed case member. The cover member is mounted on the metal base member with the printed board interposed between the metal base member and the cover member, and the terminal pin extends through the metal base member, the printed board, and the cover member and electrically connected with the second electrode of the piezoelectric element.

In accordance with a second aspect of the present invention, there is provided an acceleration sensor for detecting an acceleration caused by an object oscillated in an oscillation direction, comprising: a sensor casing having a center axis and to be positioned in coaxial alignment with the oscillation direction to receive the acceleration, the sensor casing including a cylindrical fixed case member having a supporting portion axially extending, and a cover assembly provided on the fixed case member to cover the fixed case member to define a closed space, an oscillation plate accommodated in the closed space of the sensor casing and having a central portion supported by the supporting portion of the fixed case member, and a peripheral portion integrally formed with the central portion and extending radially outwardly of the central portion to be freely movable with respect to the supporting portion of the fixed case member, and the oscillation plate being partly oscillatable along the center axis with respect to the fixed case member, a piezoelectric element held in contact with the oscillation plate to generate a voltage indicative of the acceleration when the acceleration is exerted on the sensor casing to have the oscillation plate partly oscillated along the center axis with respect to the sensor casing with the peripheral portion of the oscillation plate being deformed, and the piezoelectric element having first and second surfaces respectively having first and second electrodes mounted thereon to have the voltage indicative of the acceleration to output therethrough; first and second terminal pins extending through the cover assembly and terminating at the exterior of the cover assembly, and a printed board retained by the cover assembly to have the electrodes of the piezoelectric element and the terminal pins connected with each other.

In the above acceleration sensor, the fixed case member and the oscillation plate may be each made of an electroconductive material to ensure that the first electrode is electrically connected with the oscillation plate and the fixed case member. The cover assembly comprises a metal base member made of an electroconductive material and a cover member made of an insulating material. The metal base member may have a peripheral end portion welded to part of the fixed case member with the closed space defined by the metal base member and the fixed case member. The cover member is mounted on the metal base member with the printed board interposed between the metal base member and the cover member. The first terminal pin extends through the metal base member, the printed board and the cover member to be electrically connected with the first electrode of the piezoelectric element by way of the fixed case member, the metal base member and the printed board. On the other hand, the second terminal pin extends through the metal base member, the printed board and the cover member to be electrically connected directly with the second electrode of the piezoelectric element.

In the above acceleration sensor, the metal base member is formed with a central hole, and the terminal pin having a contacting rod portion projecting from the printed board and extending through the central hole of the metal base member to project into the closed space in electrical connection with the second electrode of the piezoelectric element.

In the above acceleration sensor, the printed board may have a signal processing circuit.

In the above acceleration sensor, the cover member has a first surface firmly held in contact with the metal base member and a second surface open to the atmosphere, and the fixed case member has a large diameter portion, a small diameter portion, and an annular ledge portion having the large and small diameter portions integrally formed with each other to have the peripheral end portion of the metal base member mounted thereon and welded thereto. The small diameter portion has an open peripheral edge inwardly bent to be firmly engaged with the second surface of the cover member.

In the above acceleration sensor, the cover member is smaller in diameter than the metal base member to form an annular gap between the inner surface of the small diameter portion of the fixed case member and the outer peripheral end surface of the cover member, and which further comprises a resilient ring disposed in the annular gap and rested on the metal base member to have the closed space hermetically sealed.

In the above acceleration sensor, the resilient ring may be made of an O-ring.

In the above acceleration sensor, the cover member may be formed with a circular recess having the printed board received therein, and an annular groove open to the circular recess. The metal base member is formed with an annular projection extending through the printed board and snugly received in the annular groove of the cover member to have the cover member positioned with respect to the metal base member with the printed board positioned interposed between the cover member and the metal base member.

In the above acceleration sensor, the fixed case member may have a screw portion to be screwed to an exterior object which is to receive the acceleration.

In accordance with a third aspect of the present invention, there is provided an acceleration sensor for detecting an acceleration caused by an object oscillated in an oscillation direction, comprising a sensor casing having a center axis and to be positioned in coaxial alignment with the oscillation direction to receive the acceleration, the sensor casing including a cylindrical fixed case member and a cover assembly provided on the fixed case member, the fixed case member having a circular bottom portion having a first circular inner surface, a cylindrical side portion integrally formed with the bottom portion, and a supporting portion projecting from the bottom portion, the cover assembly having a circular cover portion having a second circular inner surface, and a cylindrical side portion integrally formed with the cover portion, the side portion of the sensor casing partly having a third cylindrical inner surface connected at one end with the first inner surface of the bottom portion, the side portion of the cover assembly partly having the third cylindrical inner surface connected at the other one end with the second inner surface of the cover portion, the first inner surface of the bottom portion of the fixed case member, the second inner surface of the cover portion of the cover assembly, the third inner surface of the side portion of the fixed case member, and the third inner surface of the side portion of the cover assembly collectively defining a cylindrical closed space; an oscillation plate accommodated in the closed space of the sensor casing and having a central portion supported by the supporting portion of the fixed case member of the sensor casing, and a peripheral portion integrally formed with the central portion and extending radially outwardly of the central portion to be freely movable with respect to the supporting portion of the fixed case member of the sensor casing, the oscillation plate having a first surface opposing to and spaced apart from the cover assembly and a second surface opposing to and spaced apart from the bottom portion of the fixed case member, the oscillation plate being partly oscillatable along the center axis with respect to the fixed case member; and a piezoelectric element held in contact with the oscillation plate to generate a voltage indicative of the acceleration when the acceleration is exerted on the sensor casing to have the oscillation plate partly oscillated along the center axis with respect to the sensor casing with the peripheral portion of the oscillation plate being deformed, the piezoelectric element having first and second electrodes mounted thereon, the first electrode disposed between the piezoelectric element and the oscillation plate, the second electrode opposing the cover assembly, the first and second electrodes allowing the voltage indicative of the acceleration to output therethrough, the oscillation plate having a thickness $t_1$ (mm), and an effective oscillation radius $R_1$ (mm) measured between the inner and outer ends of the peripheral portion of the oscillation plate, wherein the ratio of the effective oscillation radius $R_1$ (mm) to the thickness $t_1$ (mm) of the oscillation plate may be maintained within a fluctuation range of 3.3 plus minus 1.5, i.e., given by the equation as follows, $$R_1/t1=3.3\pm1.5$$

In the above acceleration sensor, the piezoelectric element has a radially outer end, the peripheral portion of the oscillation plate has a radially inner end, and the length between the radially outer end of the piezoelectric element and the radially inner end of the oscillation plate being $R_2$ (mm), wherein $R_2$ (mm) may be equal to 0.5 plus minus 0.25, multiplied by $R_1$ (mm), i.e., given by the equation as follows, $$R_2=(0.5\pm0.25)R_1$$

In the above acceleration sensor, the supporting portion of the fixed case member has a cylindrical section and a forward tapered section integrally formed with the cylindrical section and in the form of a truncated cone shape, the forward tapered section having a top surface securely held in contact with the second surface of the oscillation plate and having an outer end edge in axially alignment with the outer peripheral end of the peripheral portion of the oscillation plate, the outer end edge having a diameter $\phi C_1$ (mm) and the piezoelectric element being in the form of an annular shape to have an inner diameter $\phi B_2$ (mm), whereby the inner diameter $\phi B_2$ (mm) of the annular shape of the piezoelectric element is approximately equal to or greater than the diameter $\phi C_1$ (mm) of the outer end edge of the top surface of the supporting portion.

In the above acceleration sensor, the piezoelectric element has a thickness $t_2$, whereby the thickness $t_1$ (mm) of the oscillation plate is approximately equal to the thickness $t_2$ (mm) of the piezoelectric element, or the ratio of the thickness $t_1$ (mm) of the oscillation plate to the thickness $t_2$ of the piezoelectric element may be within a fluctuation range of 0.5 to 3.

In accordance with a fourth aspect of the present invention, there is provided an acceleration sensor for detecting an acceleration caused by an object oscillated in an oscillation direction, comprising a sensor casing having a center axis and to be positioned in coaxial alignment with the oscillation direction to receive the acceleration, the sensor casing including a cylindrical fixed case member and a cover assembly provided on the fixed case member, the fixed case member having a circular bottom portion having a first circular inner surface, a cylindrical side portion integrally formed with the bottom portion, and a supporting portion projecting from the bottom portion, the cover assembly having a circular cover portion having a second circular inner surface, and a cylindrical side portion integrally formed with the cover portion, the side portion of the sensor casing partly having a third cylindrical inner surface connected at one end with the first inner surface of the bottom portion, the side portion of the cover assembly partly having the third cylindrical inner surface connected at the other one end with the second inner surface of the cover portion, the first inner surface of the bottom portion of the fixed case member, the second inner surface of the cover portion of the cover assembly, the third inner surface of the side portion of the fixed case member, and the third inner surface of the side portion of the cover assembly collectively defining a cylindrical closed space; an oscillation plate accommodated in the closed space of the sensor casing and having a central portion supported by the supporting portion of the fixed case member of the sensor casing, and a peripheral portion integrally formed with the central portion and extending radially outwardly of the central portion to be freely movable with respect to the supporting portion of the fixed case member of the sensor casing, the oscillation plate having a first surface opposing to and spaced apart from the cover assembly and a second surface opposing to and spaced apart from the bottom portion of the fixed case member, the oscillation plate being partly oscillatable along the center axis with respect to the fixed case member; a first piezoelectric element having flat surfaces and provided on the first flat surface of the oscillation plate to generate a voltage indicative of the acceleration when the acceleration is exerted on the sensor casing to have the oscillation plate partly oscillated along the center axis with respect to the sensor casing with the peripheral portion of the oscillation plate being deformed; a second piezoelectric element having flat surfaces and provided on the second flat surface of the oscillation plate to generate a voltage indicative of the acceleration when the acceleration is exerted on the sensor casing to have the oscillation plate partly oscillated along the center axis with respect to the sensor casing with the peripheral portion of the oscillation plate being deformed, the first and second piezoelectric elements each having a pair of electrodes having the voltage indicative of the acceleration to output therethrough, and the oscillation plate and the first and second piezoelectric elements being integrally oscillatable within a range of effective oscillation frequencies, the electrodes allowing the voltage indicative of the acceleration to output therethrough, the oscillation plate having a thickness $t_1$ (mm), and an effective oscillation radius $R_1$ (mm) measured between the inner and outer ends of the peripheral portion of the oscillation plate, wherein the ratio of the effective oscillation radius $R_1$ (mm) to the thickness $t_1$ (mm) of the oscillation plate is maintained within a fluctuation range of 3.3 plus minus 1.5, i.e., given by the equation as follows, $$R_1/t1=3.3\pm1.5.$$

In the above acceleration sensor, the piezoelectric element has a radially outer end, the peripheral portion of the oscillation plate has a radially inner end, the length between the radially outer end of the piezoelectric element and the radially inner end of the oscillation plate being $R_2$ (mm), wherein $R_2$ (mm) may be equal to 0.5 plus minus 0.25, multiplied by $R_1$ (mm), i.e., given by the equation as follows, $$R_2=(0.5\pm0.25)R_1$$

In the above acceleration sensor, the supporting portion of the fixed case member has a cylindrical section and a forward tapered section integrally formed with the cylindrical section and in the form of a truncated cone shape, the forward tapered section having a top surface securely held in contact with the second surface of the oscillation plate and having an outer end edge in axially alignment with the outer peripheral end of the peripheral portion of the oscillation plate, the outer end edge having a diameter $\phi C_1$ (mm) and the piezoelectric element being in the form of an annular shape to have an inner diameter $\phi B_2$ (mm), whereby the inner diameter $\phi B_2$ (mm) of the annular shape of the piezoelectric element may be approximately equal to or greater than the diameter $\phi C_1$ (mm) of the outer end edge of the top surface of the supporting portion.

In the above acceleration sensor, the piezoelectric element has a thickness $t_2$, whereby the thickness $t_1$ (mm) of the oscillation plate may be approximately equal to the thickness $t_2$ (mm) of the piezoelectric element, or the ratio of the thickness $t_1$ (mm) of the oscillation plate to the thickness $t_2$ of the piezoelectric element may be within a fluctuation range of 0.5 to 3.

In accordance with a fifth aspect of the present invention, there is provided an acceleration sensor for detecting an acceleration caused by an object oscillated in an oscillation direction, comprising a sensor casing having a center axis and to be positioned in coaxial alignment with the oscillation direction to receive the acceleration, the sensor casing including a cylindrical fixed case member having a supporting portion axially extending, and a cover assembly provided on the fixed case member to cover the fixed case member to define a closed space; an oscillation plate accommodated in the closed space of the sensor casing and having a central portion supported by the supporting portion of the fixed case member, and a peripheral portion integrally formed with the central portion and extending radially outwardly of the central portion to be freely movable with respect to the supporting portion of the fixed case member, the oscillation plate being partly oscillatable along the center axis with respect to the fixed case member, a piezoelectric element held in contact with the oscillation plate to generate a voltage indicative of the acceleration when the acceleration is exerted on the sensor casing to have the oscillation plate partly oscillated along the center axis with respect to the sensor casing with the peripheral portion of the oscillation plate being deformed, the piezoelectric element having a pair of electrodes having the voltage indicative of the acceleration to output therethrough, and the oscillation plate and the piezoelectric element being integrally oscillatable within a range of effective oscillation frequencies; and at least one terminal pin extending through the cover assembly and terminating at the exterior of the cover assembly, the terminal pin electrically connected with one of the electrodes; whereby the oscillation plate and the piezoelectric element may be integrally oscillatable in two different modes consisting of: a first oscillation mode where the oscillation plate is irregularly deformed to have the peripheral portion oscillated with a single vector in the oscillation direction of the oscillation plate when the oscillation plate is oscillated with respect to the fixed case member at a resonance frequency $f_0$; and a second oscillation mode where the oscillation plate is irregularly deformed to have two different half parts of the peripheral portion oscillated with their respective different vectors opposite to each other in the oscillation direction of the oscillation plate when the oscillation plate is oscillated with respect to the fixed case member at a noise frequency $f_0 1$, and the resonance frequency $f_0$ and the noise frequency $f_0 1$ may be out of the range of effective oscillation frequencies.

In the above acceleration sensor, the supporting portion of the fixed case member has a cylindrical section and a forward tapered section integrally formed with the cylindrical section and in the form of a truncated cone shape, the forward tapered section having a top surface securely held in contact with the second surface of the oscillation plate and having an outer end edge in axially alignment with the outer peripheral end of the peripheral portion of the oscillation plate, the outer end edge having a diameter $\phi C_1$ (mm), and the oscillation plate having an effective oscillation radius $R_1$ (mm) measured between the inner and outer ends of the peripheral portion of the oscillation plate; whereby the oscillation plate and the piezoelectric element may be integrally oscillatable in the first and second oscillation modes with $\phi C_1$ (mm)/$R_1$ (mm) and $f_0 1/f_0$ given in the following equation:

$$\phi C_1 \text{ (mm)}/R_1 \text{ (mm)} \geq 0.92 \text{ and } f_0 1/f_0 \geq 0.52.$$

In the above acceleration sensor, the fixed case member and the oscillation plate are each made of an electroconductive material to ensure that the remaining one of the electrodes is electrically connected with the oscillation plate and the fixed case member.

In accordance with a sixth aspect of the present invention, there is provided an acceleration sensor for detecting an acceleration caused by an object oscillated in an oscillation direction, comprising a sensor casing having a center axis and to be positioned in coaxial alignment with the oscillation direction to receive the acceleration, the sensor casing including a cylindrical fixed case member having a supporting portion axially extending, and a cover assembly provided on the fixed case member to cover the fixed case member to define a closed space; an oscillation plate accommodated in the closed space of the sensor casing and having a central portion supported by the supporting portion of the fixed case member, and a peripheral portion integrally formed with the central portion and extending radially outwardly of the central portion to be freely movable with respect to the supporting portion of the fixed case member, the oscillation plate being partly oscillatable along the center axis with respect to the fixed case member, the oscillation plate having a first flat surface opposing and spaced apart along the center axis with respect to the fixed case member, and a second flat surface opposing and spaced apart along the center axis with respect to the cover assembly of the sensor casing; a first piezoelectric element having a first surface and a second surface, the first surface of the first piezoelectric element held in contact with the first flat surface of the oscillation plate to generate a voltage indicative of the acceleration when the acceleration is exerted on the sensor casing to have the oscillation plate partly oscillated along the center axis with respect to the sensor casing with the peripheral portion of the oscillation plate being deformed; a second piezoelectric element having a first surface and a second surface, the first surface of the second piezoelectric element held in contact with the second flat surface of the oscillation plate to generate a voltage indicative of the acceleration when the acceleration is exerted on the sensor casing to have the oscillation plate partly oscillated along the center axis with respect to the sensor casing with the peripheral portion of the oscillation plate being deformed, the first and second piezoelectric elements each having a plurality of electrodes having the voltage indicative of the acceleration to output therethrough, the electrodes including a first electrode provided on the second surface of the first piezoelectric element, and a second electrode provided on the second surface of the second piezoelectric element, and the oscillation plate and the first and second piezoelectric elements being integrally oscillatable within a range of effective oscillation frequencies; and at least one terminal pin extending through the cover assembly and terminating at the exterior of the cover assembly, the terminal pin electrically connected with the first and second electrodes; whereby the oscillation plate and the first and second piezoelectric elements may be integrally oscillatable in two different modes consisting of: a first oscillation mode where the oscillation plate is irregularly deformed to have the peripheral portion oscillated with a single vector in the oscillation direction of the oscillation plate when the oscillation plate is oscillated with respect to the fixed case member at a resonance frequency $f_0$; and a second oscillation mode where the oscillation plate is irregularly deformed to have two different half parts of the peripheral portion oscillated with their respective different vectors opposite to each other in the oscillation direction of the oscillation plate when the oscillation plate is oscillated with respect to the fixed case member at a noise frequency $f_01$, and the resonance frequency $f_0$ and the noise frequency $f_01$ are out of the range of effective oscillation frequencies.

In the above acceleration sensor, the supporting portion of the fixed case member has a cylindrical section and a forward tapered section integrally formed with the cylindrical section and in the form of a truncated cone shape, the forward tapered section having a top surface securely held in contact with the second surface of the oscillation plate and having an outer end edge in axially alignment with the outer peripheral end of the peripheral portion of the oscillation plate, the outer end edge having a diameter $\phi C_1$ (mm), and the oscillation plate having an effective oscillation radius $R_1$ (mm) measured between the inner and outer ends of the peripheral portion of the oscillation plate; whereby the oscillation plate and the first and second piezoelectric element may be integrally oscillatable in the first and second oscillation modes with $\phi C_1$ (mm)/$R_1$ (mm) and $f_01/f_0$ given in the following equation:

$$\phi C_1 \text{ (mm)}/R_1 \text{ (mm)} \geq 0.92 \text{ and } f_01/f_0 \geq 0.52.$$

In the above acceleration sensor, the first piezoelectric element has a third electrode provided on the first surface of the first piezoelectric element, and second piezoelectric element has a fourth electrode provided on the first surface of the second piezoelectric element, and the fixed case member and the oscillation plate are each made of an electroconductive material and to ensure that the third electrode of first piezoelectric element and the fourth electrode of the second piezoelectric element are electrically connected with the oscillation plate and the fixed case member.

In the above acceleration sensor, the cover assembly comprises a metal base member made of an electroconductive material and a cover member made of an insulating material, the metal base member having a peripheral end portion secured to part of the fixed case member with the closed space defined by the metal base member and the fixed case member, the cover member being mounted on the metal base member, and the terminal pin extending through the metal base member and the cover member and electrically connected with the second electrode of the piezoelectric element.

In the above acceleration sensor, the metal base member is formed with a central hole, and the terminal pin having a contacting rod portion extending through the central hole of the metal base member to project into the closed space in electrical connection with the second electrode of the piezoelectric element.

In the above acceleration sensor, the cylindrical side portion is smaller in diameter than the metal base member to form an annular gap between the inner surface of the small diameter portion of the fixed case member and the outer peripheral end surface of the cover member, and which further comprises a resilient ring disposed in the annular gap and rested on the metal base member to have the closed space hermetically sealed.

In the above acceleration sensor, the resilient ring is made of an O-ring.

In the above acceleration sensor, the metal base member having a peripheral end portion welded to part of the fixed case member.

In the above acceleration sensor, the fixed case member has a large diameter portion, a small diameter portion, and an annular ledge portion having the large and small diameter portions integrally formed with each other to have the peripheral end portion of the metal case member firmly mounted thereon and welded thereto, the small diameter portion having an open peripheral edge inwardly bent to be firmly engaged with the second surface of the cover member.

In the above acceleration sensor, the metal base member has a peripheral end portion secured to part of the fixed case member with the closed space defined by the metal base member and the fixed case member. The cover member is mounted on the metal base member, and the terminal pin extends through the metal base member and the cover member and electrically connected with the one of the electrodes of the piezoelectric element.

In the above acceleration sensor, the peripheral end portion of the metal base member is welded to the part of the fixed case member. The fixed case member has a screw portion to be screwed to an exterior object which is to receive the acceleration. In the above acceleration sensor, the resonance frequency $f_0$ is 20 kHz or greater, and the range of effective oscillation frequencies is between 0 and 15 kHz.

BRIEF DESCRIPTION OF THE DRAWINGS

The feature and advantages of the present invention will become more apparent from the following detailed description when considered in connection with the accompanying drawings, wherein:

FIG. 2 is an enlarged cross-sectional view showing the constitution elements and parts forming part of the acceleration sensor used to describe how to assemble the acceleration sensor shown in FIG. 1;

FIG. 6 is a table showing constants of E (Young's modulus), ρ (density), and σ (Poisson's ratio) of the oscillation plate and the piezoelectric element forming parts of the acceleration sensor;

FIG. 13 is an enlarged cross-sectional view similar to FIG. 5 but showing the dimensions of the oscillation plate, the piezoelectric element, and the supporting portion forming parts of the acceleration sensor used for actual measurements;

FIG. 14 is a table showing the relationship between the sensitivity $V_0$/the resonance frequency $f_0$, and the inner diameter $\phi B_2$ (mm) of the piezoelectric element with respect to the diameter $\phi C_1$ (mm) of the supporting portion;

FIG. 15 is a table showing the relationship between the sensitivity $V_0$/the resonance frequency $f_0$, and the proportion of the thickness $t_1$ of the oscillation plate with respect to the thickness t2 of the piezoelectric element;

FIG. 17 is a table showing the result of experiments performed to prove whether spurious is eliminated or not;

FIG. 18 is a graph showing the result of experiments performed to prove whether spurious is eliminated or not;

DESCRIPTION OF THE PREFERRED EMBODIMENTS

A preferred embodiment of the acceleration sensor according to the present invention will now be described in detail in accordance with the accompanying drawings.

Figure 1:
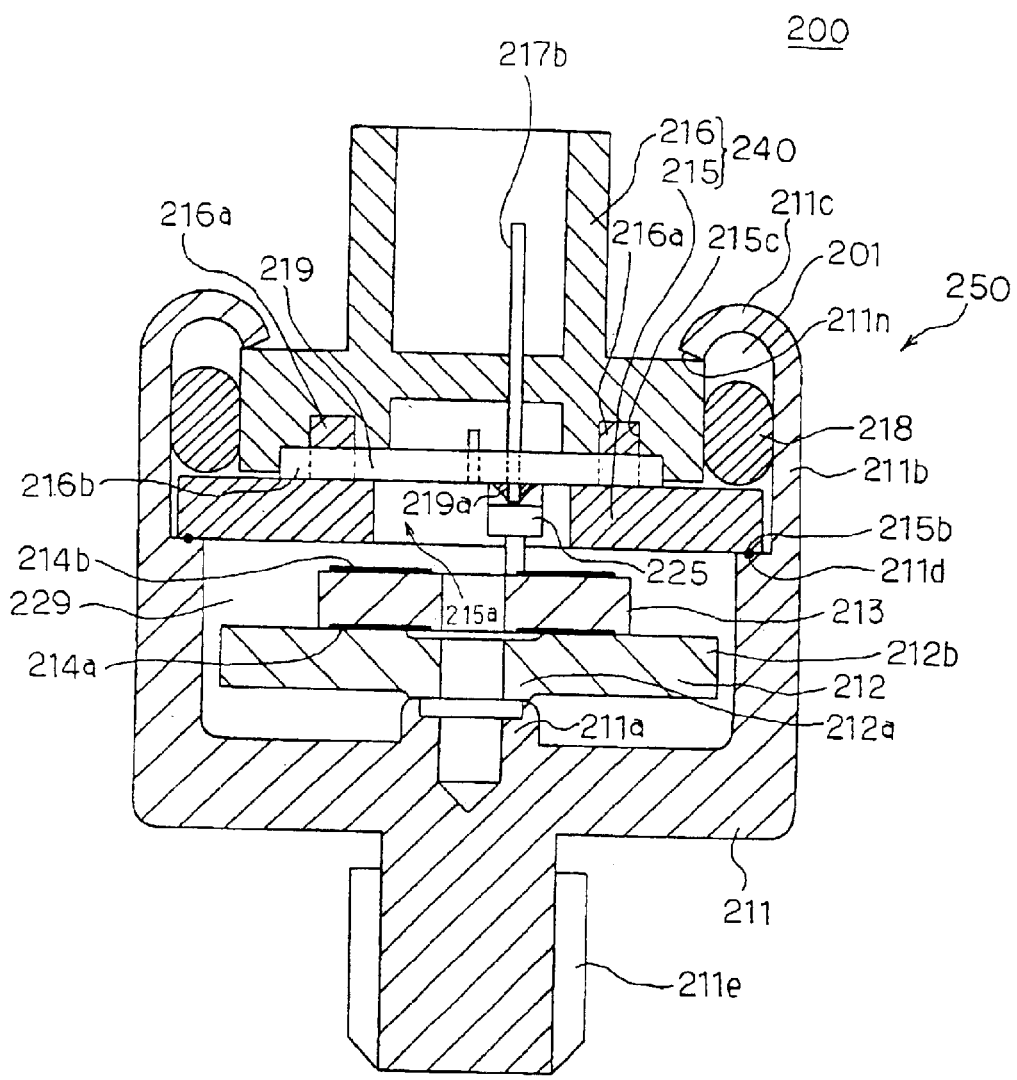
FIG. 1 is a cross-sectional view of a first embodiment of an acceleration sensor according to the present invention.

Referring now to FIGS. 1 and 2 of the drawings, there is shown a first preferred embodiment of the acceleration sensor 200 assumed to be installed on an engine of an automotive vehicle. The acceleration sensor 200 is shown in FIGS. 1 and 2 as comprising a sensor casing 250 having a center axis and to be positioned in coaxial alignment with the oscillation direction to receive the acceleration. The sensor casing 250 includes a cylindrical fixed case member 211 having a supporting portion 211a axially extending, and a cover assembly 240 provided on the fixed case member 211 to cover the fixed case member 211 to define a closed space 229. The acceleration sensor 200 further comprises an oscillation plate 212 accommodated in the closed space 229 of the sensor casing 250 and having a central portion 212a supported by the supporting portion 211a of the fixed case member 211, and a peripheral portion 212b integrally formed with the central portion 212a and extending radially outwardly of the central portion 212a to be freely movable with respect to the supporting portion 211a of the fixed case member 211. The oscillation plate 212 is adapted to be partly oscillatable along the center axis with respect to the fixed case member 211.

In the second conventional acceleration sensor 110, the oscillation plate 102 is securely mounted on the metal base member 112 (see FIG. 27), thereby causing the oscillation plate 102 to be oscillated together with the metal base member 112 and the fixed case member 111, each of which has a low resonance frequency. This leads to the fact that the resonance frequency $f_0$ of the oscillation plate 102 is lowered. In the acceleration sensor 200 thus constructed, on the other hand, the oscillation plate 212 is not securely mounted on the cover assembly 240 as shown in FIG. 1, thereby making it possible for the resonance frequency $f_0$ of the oscillation plate 212 to prevent from being lowered but to remain beyond a predetermined range of effective frequencies actually used for detecting an acceleration.

The acceleration sensor 200 further comprises a piezoelectric element 213 held in contact with the oscillation plate 212 to generate a voltage indicative of the acceleration when the acceleration is exerted on the sensor casing 250 to have the oscillation plate 212 partly oscillated along the center axis with respect to the sensor casing 250 with the peripheral portion 212b of the oscillation plate 212 being deformed. The piezoelectric element 213 has first and second surfaces respectively having first and second electrodes 214a, 214b mounted thereon to have a voltage indicative of the acceleration to output therethrough. The piezoelectric element 213 is made of a piezoelectric material such as ceramic.

The oscillation plate 212 is adapted to be oscillated when an exterior object such as an engine is oscillated. The oscillation of the oscillation plate 212 causes the piezoelectric element 213 to be oscillated and deformed to generate an electric charge Q. The output voltage V is outputted in accordance with a capacitance C of the piezoelectric element 213 as given in the equation stated below. The acceleration is then detected by measuring the output voltage V thus obtained.

$$V=Q/C$$

Figure 28:
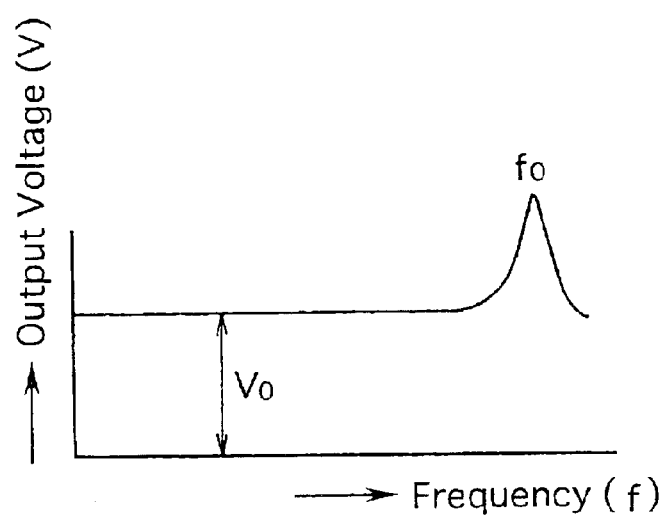
FIG. 28 is a graph showing the relationship between frequency f and output voltage V.

The first embodiment of the acceleration sensor 200 further comprises an oscillation plate 212 with the central portion 212a securely supported similar to the first and second conventional acceleration sensors 100 and 110 and designed to have a resonance frequency $f_O$ of the oscillation plate 212 out of the predetermined range of effective oscillation frequencies actually used for detecting an acceleration so that the flat portion $V_O$ of the output voltage range is used for detecting an acceleration (see FIG. 28).

The acceleration sensor 200 further comprises a terminal pin 217b extending through the cover assembly 240 and terminating at the exterior of the cover assembly 240, and a printed board 219 retained by the cover assembly 240 to have the second electrode 214b of the piezoelectric element 213 and the terminal pin 217b connected with each other. This leads to the fact that the terminal pin 217b serves as an output terminal. The printed board 219 has a copper plated pattern 219a on one or both surfaces thereof.

In the first embodiment of the acceleration sensor 200, the fixed case member 211 and the oscillation plate 212 are each made of an electroconductive material to ensure that the first electrode 214a is electrically connected with the oscillation plate 212 and the fixed case member 211. This means that the fixed case member 211 serves as a ground. The cover assembly 240 comprises a metal base member 215 made of an electroconductive material and a cover member 216 made of an insulating material such as resin. The metal base member 215 has a peripheral end portion 215b welded to part of the fixed case member 211 with the closed space 229 defined by the metal base member 215 and the fixed case member 211. Thus, the metal base member 215, the cover member 216, and the fixed case member 211 can be securely mounted by way of an automatic assembly device. The oscillation plate 212 and the piezoelectric element 213 are accommodated in the closed space 229 as shown in FIG. 2. The cover member 216 is mounted on the metal base member 215 with the printed board 219 interposed between the metal base member 215 and the cover member 216. The terminal pin 217b extends through the metal base member 215, the printed board 219 and the cover member 216. The printed board 219 is electrically connected with the second electrode 214b of the piezoelectric element 213. The fact that the metal base member 215, the cover member 216, and the fixed case member 211 can be securely mounted by way of an automatic assembly device, makes it easy for the acceleration sensor 200 to be automatically assembled as shown in FIG. 2.

In the acceleration sensor 200, the metal base member 215 is formed with a central hole 215a, and the terminal pin 217b having a contacting rod portion 225 projecting from the copper plated pattern 219a of the printed board 219 and extending through the central hole 215a of the metal base member 215 to project into the closed space 229 in electrical connection with the second electrode 214b of the piezoelectric element 213.

The terminal pin 217b electrically not in connection with the metal base member 215 is electrically connected with the second electrode 214b of the piezoelectric element 213 through the contacting rod portion 225. This enables the acceleration sensor 200 to detect an acceleration in a manner that the oscillation of the oscillation plate 212 causes the piezoelectric element 213 to generate output voltage V, which is outputted to the exterior connector, not shown, through the printed board 219, the contacting rod portion 225, and the terminal pin 217b. The contacting rod portion 225 may be replaced with other means, for instance, a lead line electrically connecting the second electrode 214b of the piezoelectric element 213 while the contacting rod portion 225 of the acceleration sensor 200 is appropriate for the automatic assembly of the acceleration sensor 200.

The printed board 219 has a signal processing circuit. The printed board 219 may be replaced with a circuit soldered with the copper plated pattern 219a, having an impedance converter circuit, an amplifier circuit, and a resistance r for detecting a disconnection, connected in parallel with the piezoelectric element 213.

In the acceleration sensor 200, the cover member 216 has a first surface firmly held in contact with the metal base member 215 and a second surface open to the atmosphere. The fixed case member 211 has a large diameter portion 211b, a small diameter portion 211c, and an annular ledge portion 211d having the large and small diameter portions 211b and 211c integrally formed with each other to have a peripheral end portion 215b of the metal base member 215 mounted thereon and welded thereto. The small diameter portion 211c has an open peripheral edge 211n inwardly bent to be firmly engaged with the second surface of the cover member 216. This means that the metal base member 215 and the cover member 216 can be securely mounted by way of an automatic assembly device, thereby making it easy for the acceleration sensor 200 to be automatically assembled.

In the acceleration sensor 200, the cover member 216 is smaller in diameter than the metal base member 215 to form an annular gap 201 between the inner surface of the small diameter portion 211c of the fixed case member 211 and the outer peripheral end surface of the cover member 216. The acceleration sensor 200 comprises a resilient ring 218 disposed in the annular gap 201 and rested on the metal base member 215 to have the closed space 229 hermetically sealed. Furthermore, the resilient ring 218 may be made of an O-ring. Here, the peripheral end portion 215b of the metal base member 215 may not be welded to the annular ledge portion 211d of the fixed case member 211. The the metal base member 215 and the cover member 216 can be securely mounted by way of an automatic assembly device, thereby making it easy for the acceleration sensor 200 to be automatically assembled.

In the acceleration sensor 200, the cover member 216 is formed with a circular recess 216b and an annular groove 216a open to the circular recess 216b. The printed board 219 is received in the circular recess 216b. The metal base member 215 is formed with an annular projection 215c extending through the printed board 219 and snugly received in the annular groove 216a of the cover member 216 to have the cover member 216 positioned with respect to the metal base member 215 with the printed board 219 positioned interposed between the cover member 216 and the metal base member 215. This leads to the fact that the metal base member 215, cover member 216, and the printed board 219 are securely mounted and integrated with fixed case member 211 having the oscillation plate 12 and the piezoelectric element 13 received therein, thereby enabling to handle all of the aforesaid parts as one piece.

In the acceleration sensor 200, the fixed case member 211 has a screw portion 211e to be screwed to an exterior object which is to receive the acceleration to ensure that the oscillation plate 212 is oscillated with respect to the fixed case member 211 when the exterior object is oscillated.

The following description will be directed to how to design the previously described acceleration sensor 200 according to the present invention and how to determine the dimensions of the constitution elements and parts forming part of the acceleration sensor 200.

The dimensions of the acceleration sensor 200 will be described hereinlater. The resonance frequency $f_0$ of an oscillation body consisting of the oscillation plate 212 and the piezoelectric element 213 is given in the equation stated below. As seen from the equation, with the radius of the oscillation body unchanged, the thickness t is required to be increased in order to raise the resonance frequency $f_0$ of the oscillation body.

$$f_0 \approx \alpha' \cdot (t/R^2)$$

where $\alpha'$ stands for a constant.

The thickness t, however, has an upper limit. It is verified through repeated experiments that the resonance frequency $f_0$ has the maximum point. Experiment results indicate that the following three conditions are required to be satisfied in order to increase both the resonance frequency $f_0$ and the sensitivity $V_0$.

1. $R_1/t1$=radius of oscillation plate 212/thickness of oscillation plate 212≈3.3
2. $R_2/R_1$ =radius of piezoelectric element 213/radius of oscillation plate 212≈0.5
3. $t1/t2$=thickness of oscillation plate 212/thickness of piezoelectric element 213≈1

The sensitivity $V_0$ is given in the equation stated below. As seen from the equation, the sensitivity $V_0$ is enhanced as the radius R of the oscillation body is increased in contrary to the relationship between the resonance frequency $f_0$ and the radius R of the oscillation body represented in the previous equation.

$$V_0 \approx \alpha' \cdot R^2$$

As will be understood from the conditions 1, 2, and 3, the size and weight of the oscillation body is required to be extremely enlarged in order to enhance both the resonance frequency $f_0$ and the sensitivity $V_0$.

The aforesaid first conventional acceleration sensor 100 comprises a cover member 106 made of a resin material. This means that the side portion of the cover member 106 of the acceleration sensor 100 is required to be thick, thereby making it difficult for the radius $R_1$ of the oscillation plate 12 to be increased as shown in FIG. 200. While on the other hand, the first embodiment of the acceleration sensor 200 comprises a fixed case member 211 made of a metal material, and an oscillation plate 212 having a peripheral end portion 212b axially aligned with and spaced apart from the side portion of the fixed case member 211. The thickness of the fixed case member 211 can be reduced while maintaining a required strength because of the fact that the fixed case member 211 is made of a metal material. This leads to the fact that the first embodiment of the acceleration sensor 200 makes it possible to have the maximum radius $R_1$ of the oscillation plate 212 in a manner that the thickness of the side portion of the fixed case member 211 is reduced with the total size of the acceleration sensor 200 not enlarged.

Figure 27:
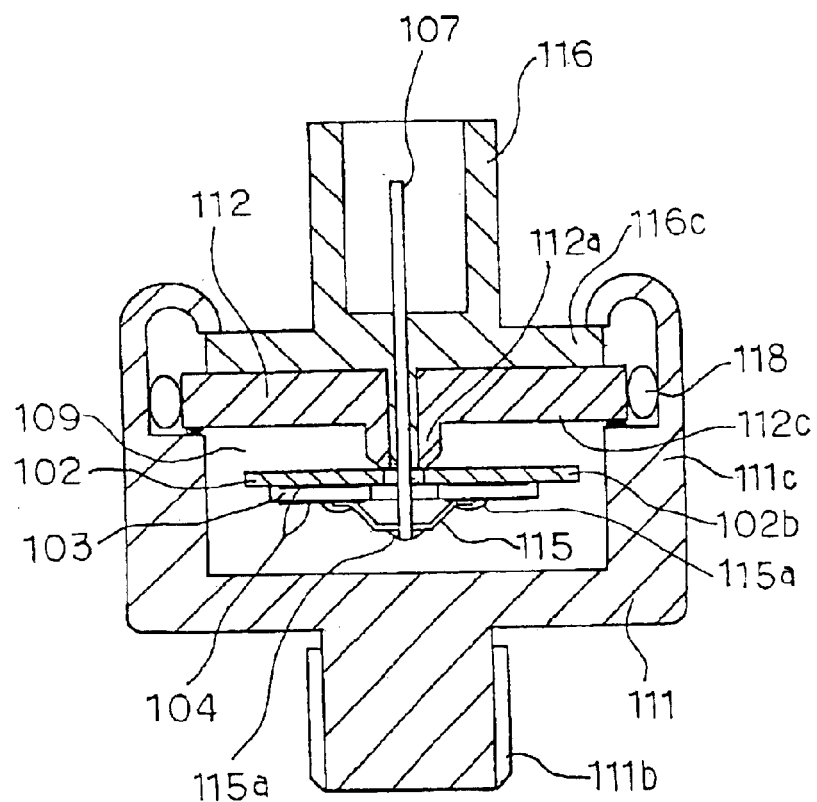
FIG. 27 is a cross-sectional view of a second conventional acceleration sensor.

In the aforesaid second conventional acceleration sensor 110, the metal base member 112 is oscillated together with the oscillation plate 102 as shown in FIG. 27, thereby decreasing the resonance frequency $f_0$. This makes it difficult for the acceleration sensor 110 with the oscillation plate 102 supported by the metal base member 112 to obtain the flat portion of the frequency characteristics within a predetermined range of effective frequencies, which does not include the resonance frequency $f_0$. While on the other hand, the first embodiment of the acceleration sensor 200 comprises an oscillation plate 212 supported on the supporting portion 211a of the fixed case member 211. The acceleration sensor 200 thus constructed can prevent the oscillation plate 212 from oscillating together with the cover assembly 240, which serves to cover the fixed case member 211. This leads to the fact that the oscillation plate 212 of the acceleration sensor 200 can be oscillated with the resonance frequency $f_0$ not decreased by cover assembly 240, thereby making it possible to have the resonance frequency $f_0$ out of the predetermined range of effective oscillation frequencies actually used for detecting an acceleration. This leads further to the fact that the acceleration sensor 200 can detect an acceleration with the output voltage within the output voltage range of the flat portion $V_0$ as shown in FIG. 28.

Figure 3:
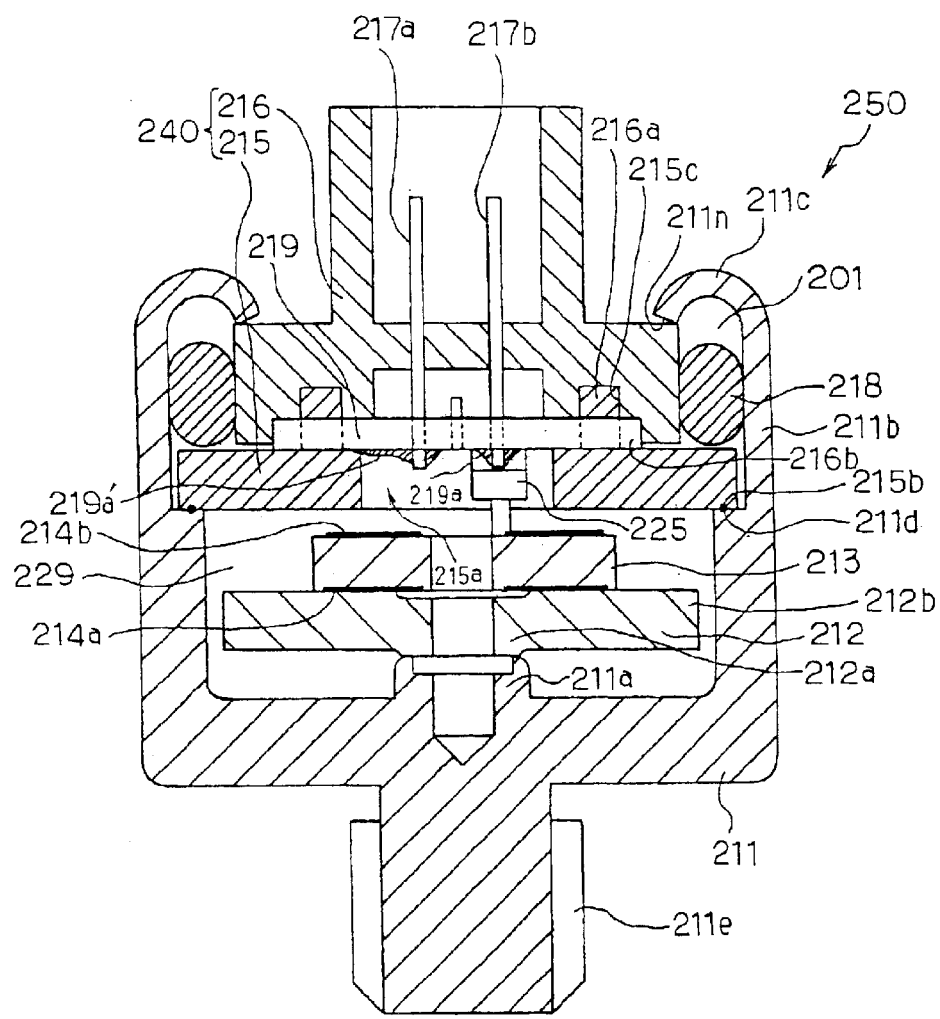
FIG. 3 is a cross-sectional view similar to FIG. 1, but showing a second embodiment of the acceleration sensor.

Referring to FIG. 3 of the drawings, there is shown a second preferred embodiment of the acceleration sensor 210 assumed to be installed on an engine of an automotive vehicle. The first embodiment of the acceleration sensor 200 is one-terminal type. The present invention can provide two-terminal type acceleration sensor. The second embodiment of the acceleration sensor 210 is two-terminal type. The same constitutional elements and parts are simply represented by the same reference numerals as those of the first embodiment of the acceleration sensor 200, and will be thus omitted from description for avoiding tedious repetition.

The acceleration sensor 210 further comprises first and second terminal pins 217a and 217b extending through the cover assembly 240 and terminating at the exterior of the cover assembly 240. The printed board 219 retained by the cover assembly 240 is adapted to have electrodes 214a and 214b of the piezoelectric element 213 and the terminal pins 217a and 217b connected with each other. The first terminal pin 217a extends through the metal base member 215, the printed board 219 and the cover member 216 to be electrically connected with the first electrode 214a of the piezoelectric element 213 by way of the fixed case member 211, the metal base member 215 and the printed board 219. This means that the first terminal pin 217a serves as a ground. The second terminal pin 217b extends through the metal base member 215, the printed board 219 and the cover member 216 to be electrically connected directly with the second electrode 214b of the piezoelectric element 213. This means that the second terminal pin 217b serves as an output terminal.

In the acceleration sensor 210, the metal base member 215 is formed with a central hole 215a, and the second terminal pin 217b has the contacting rod portion 225 projecting from the copper plated pattern 219a of the printed board 219 and extends through the central hole 215a of the metal base member 215 to project into the closed space 229 in electrical connection with the second electrode 214b of the piezoelectric element 213.

The copper plated pattern 219a' of the printed board 219 is held in contact with the metal base member 215, thereby enabling to electrically connect the first terminal pin 217a with the metal base member 215 soldered at 219a', the fixed case member 211, the oscillation plate 212 and the first electrode 214a of the piezoelectric element 213, while on the other hand the second terminal pin 217b electrically not in connection with the metal base member 215 is electrically connected with the second electrode 214b of the piezoelectric element 13 through the contacting rod portion 225. This enables the acceleration sensor 210 to detect an acceleration in a manner that the oscillation of the oscillation plate 212 causes the piezoelectric element 213 to generate output voltage V, which is outputted to the exterior connector through the printed board 219, the contacting rod portion 225, and the second terminal pin 217b.

In the second embodiment of the acceleration sensor 210, the oscillation body consisting of the oscillation plate 212 and the piezoelectric element 213 are supported by the supporting portion 211a formed on the central part of the bottom portion of the fixed case member 211. The fixed case member 211 has an annular ledge portion 211d and an open peripheral end portion 211c. The metal base member 215 has an open peripheral portion 215b welded on the annular ledge portion 211d of the fixed case member 211. The open peripheral end portion 211c of the fixed case member 211 is inwardly bent to be firmly engaged with the cover member 216 to define a closed space 229 having the oscillation body received therein. The first and second terminal pins 217a and 217b extending through cover member 216 are electrically connected with the printed board 219 in a space 215a formed by the metal base member 215 to serve as ground and output terminals, respectively. The printed board 219 is designed to electrically connect between the contacting rod portion 225 and the detection electrode 214b of the piezoelectric element 213. This leads to the fact that the detection electrode 214b of the piezoelectric element 213 is not required to be soldered to a wire.

The second conventional acceleration sensor 110 comprises an oscillation plate 102 and a piezoelectric element 103 supported by the supporting portion 112a integrally formed with the metal base member 112, which serves to cover the fixed case 111 as shown in FIG. 27. As described hereinbefore, the performance of the second conventional acceleration sensor 110 thus constructed may be deteriorated due to temperature. While on the other hand, the acceleration sensor 200 comprises an oscillation plate 212 and a piezoelectric element 213 not supported by the supporting portion integrally formed with the metal base member 215, which serves to cover the fixed case member 211, thereby preventing the acceleration sensor 200 from deteriorating the performance due to the temperature characteristics. This leads to the fact that the first and second embodiments of the acceleration sensors 200 are of high performance and appropriate for automatic production at a low cost.

Figure 29:
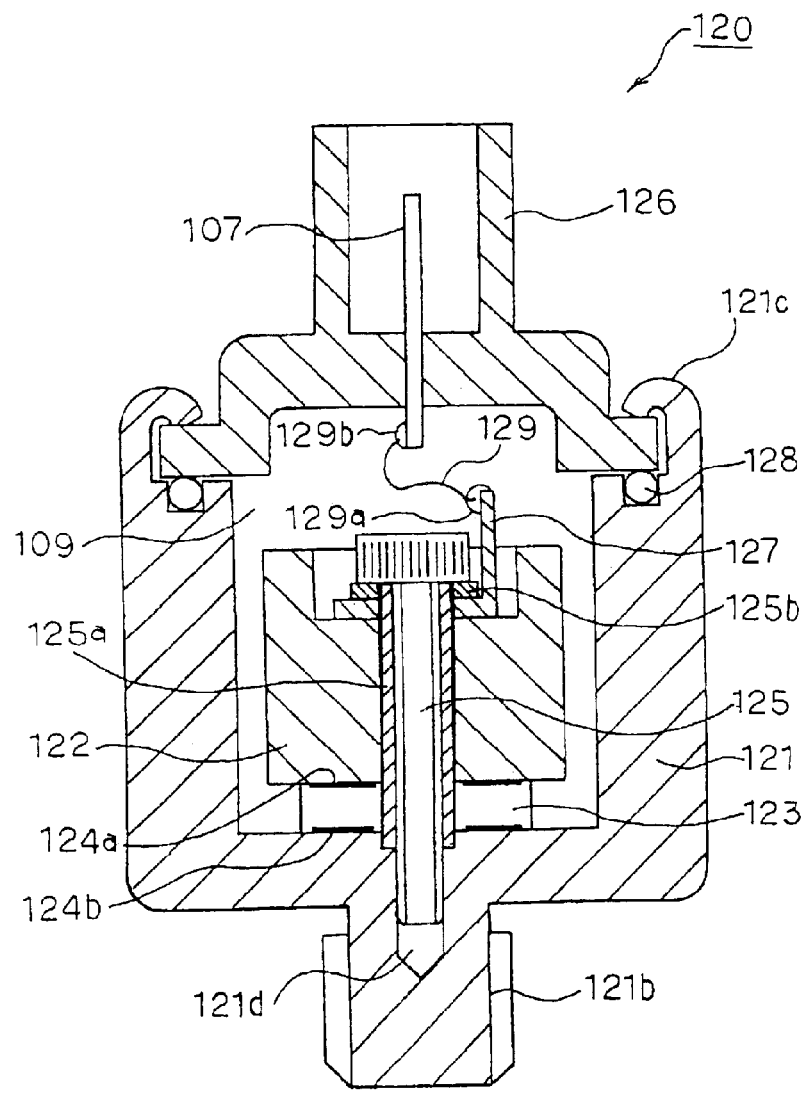
FIG. 29 is a cross-sectional view of a third conventional acceleration sensor.
Figure 30:
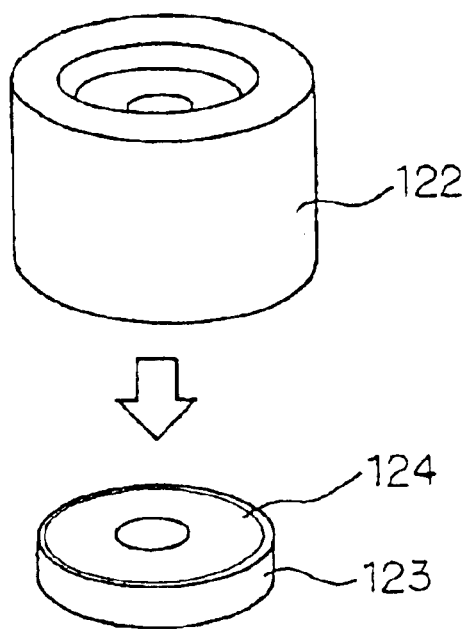
FIG. 30 is an enlarged cross-sectional view showing the constitution elements and parts forming part of the acceleration sensor shown in FIG. 29.

The third conventional acceleration sensor 120, which comprises the weight 122 for pressuring the piezoelectric element 123 as shown in FIG. 29, has many constitutional elements and parts, and is required to be large in size. Furthermore, the assembly of the acceleration sensor 120 requires works with a high degree of precision. While on the other hand, the first or second embodiments of the acceleration sensor 200 does not comprise a weight, has constitutional parts fewer than the acceleration sensor 120, and is therefore not required to be large in size. Furthermore, the assembly of the acceleration sensor 200 does not require works with a high degree of precision, thereby facilitating the automatic assembly of the acceleration sensor 200.

The acceleration sensor 200 comprises an oscillation plate 212 and a piezoelectric element 213 accommodated in the closed space 229 hermetically sealed.

The construction of the acceleration sensor 210 shown in FIG. 3 is the same as that of the acceleration sensor 200 shown in FIG. 1. It is thus to be noted that the operation and performance of the acceleration sensor 210 is also the same as those of the acceleration sensor 200.

The metal base member 215, for instance, may be provided with a hole to ensure that the acceleration sensor functions as an audio converter for ultrasound and the like.

As will be seen from the foregoing description, the acceleration sensor according to the present invention is of high performance and can be produced at a low cost. The reason is due to the fact that the fixed case member 211 and the cover assembly 240 collectively define a closed space 229 accommodating the oscillation plate 212 and the piezoelectric element 213 received therein, the oscillation plate 212 and the piezoelectric element 213 are oscillatably supported by the supporting portion 211a formed on the central bottom portion of the fixed case member 211, and the second electrode 214b of the piezoelectric element 213 is electrically connected with the exterior connector through the printed board 219 and the terminal pin 217b, thereby reducing the number of the constitutional elements and parts and facilitating the automatic assembly.

Figure 4:
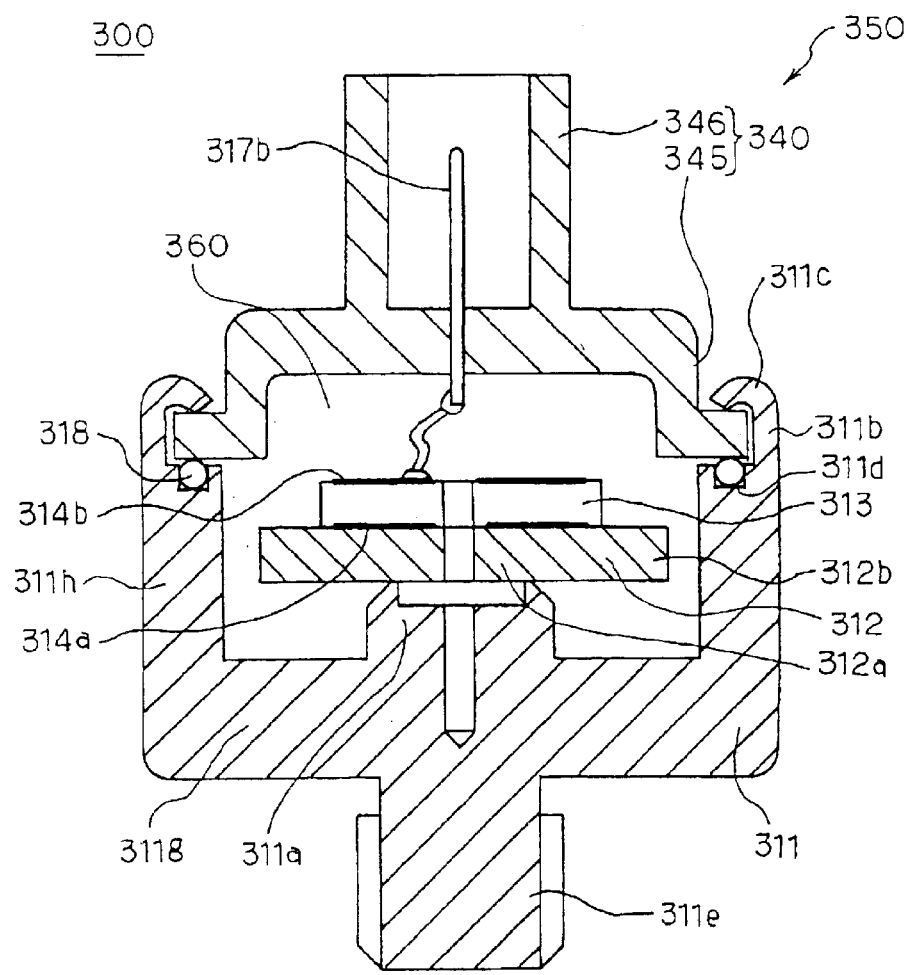
FIG. 4 is a cross-sectional view similar to FIG. 1, but showing any one of third to seventh embodiments of the acceleration sensor.
Figure 5:
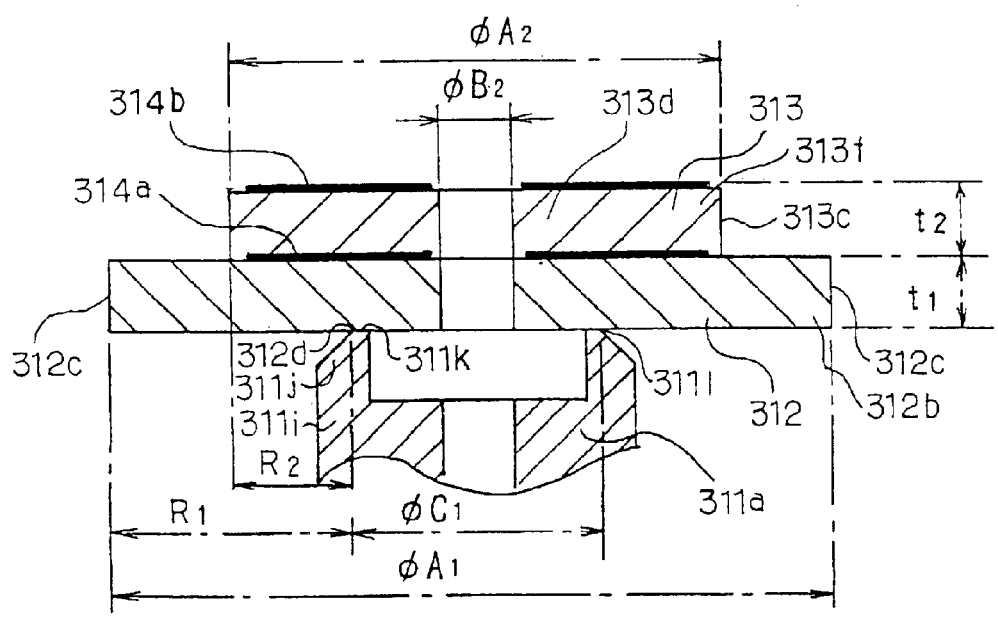
FIG. 5 is an enlarged cross-sectional view showing the dimensions of an oscillation plate, a piezoelectric element, and a supporting portion forming parts of the acceleration sensor shown in FIG. 4.

Referring also to FIGS. 4 and 5 of the drawings, there is shown a third preferred embodiment of the acceleration sensor 300 according to the present invention. The acceleration sensor 300 is assumed to be installed on an engine of an automotive vehicle.

The acceleration sensor 300 is shown in FIG. 4 as comprising a sensor casing 350 having a center axis and to be positioned in coaxial alignment with the oscillation direction to receive the acceleration. The sensor casing 350 includes a cylindrical fixed case member 311 and a cover assembly 340 provided on the fixed case member 311. The fixed case member 311 has a circular bottom portion 311g having a first circular inner surface, a cylindrical side portion 311h integrally formed with the bottom portion 311g, and a supporting portion 311a projecting from the bottom portion 311g. The cover assembly 340 has a circular cover portion 346 having a second circular inner surface, and a cylindrical side portion 345 integrally formed with the cover portion 346. The side portion 311h of the fixed case member 311 partly has a third cylindrical inner surface connected at one end with the first inner surface of the bottom portion 311g. The side portion 345 of the cover assembly 340 partly has a third cylindrical inner surface connected at the other one end with the second inner surface of the cover portion 346. The first inner surface of the bottom portion 311g of the fixed case member 311, the second inner surface of the cover portion 346 of the cover assembly 340, the third inner surface of the side portion 311h of the fixed case member 311, and the third inner surface of the side portion 345 of the cover assembly 340 collectively define a cylindrical closed space 360.

The acceleration sensor 300 further comprises an oscillation plate 312 accommodated in the closed space 360 of the sensor casing 350. The oscillation plate 312 has a central portion 312a supported by the supporting portion 311a of the fixed case member 311 of the sensor casing 350, and a peripheral portion 312b integrally formed with the central portion 312a and extending radially outwardly of the central portion 312a to be freely movable with respect to the supporting portion 311a of the fixed case member 311 of the sensor casing 350. The oscillation plate 312 has a first surface opposing to and spaced apart from the cover assembly 340 and a second surface opposing to and spaced apart from the bottom portion 311g of the fixed case member 311. The oscillation plate 312 is adapted to be partly oscillatable along the center axis with respect to the fixed case member 311.

The acceleration sensor 300 further comprises a piezoelectric element 313 held in contact with the oscillation plate 312 to generate a voltage indicative of the acceleration when the acceleration is exerted on the sensor casing 350 to have the oscillation plate 312 partly oscillated along the center axis with respect to the sensor casing 350 with the peripheral portion 312b of the oscillation plate 312 being deformed. The piezoelectric element 313 has first and second electrodes 314a, 314b mounted thereon. The first electrode 314a is disposed between the piezoelectric element 313 and the oscillation plate 312, and the second electrode 314b is disposed opposing the cover assembly 340. The first and second electrodes 314a and 314b are adapted to allow the voltage indicative of the acceleration to output therethrough. As shown in FIG. 5, the oscillation plate 312 has a thickness $t_1$ (mm), and an effective oscillation radius $R_1$ (mm) measured between the inner end 312d and outer end 312c of the peripheral portion 312b of the oscillation plate 312. The ratio of the effective oscillation radius $R_1$ (mm) to the thickness $t_1$ (mm) of the oscillation plate 312 is maintained within a fluctuation range of 3.3 plus minus 1.5, i.e., 3.3±1.5.

The acceleration sensor 300 according to the present invention has an oscillation plate 312 and a piezoelectric element 313 mounted on the supporting portion 311a of the fixed case member 311 with the center axes of the oscillation plate 312 and the piezoelectric element 313 held in axial alignment with the center axis of the supporting portion 311a of the fixed case member 311 so as to detect an acceleration. This leads to the fact that a weight and a fastening screw can be omitted to simplify the construction of the acceleration sensor, thereby making it possible to automatically assemble the acceleration sensor, and reduce the cost of producing the acceleration sensor.

The following description will be directed how to design the acceleration sensor 300 according to the present invention and how to determine the dimensions of the constitution elements and parts forming part of the acceleration sensor 300.

The numeral setting that the ratio of the effective oscillation radius $R_1$ (mm) to the thickness $t_1$ (mm) of the oscillation plate 312 is maintained within a fluctuation range of 3.3 plus minus 1.5, i.e., 3.3±1.5 is intended to keep the resonance frequency $f_0$ of the oscillation plate 312 involving the piezoelectric element 313 above 20 kHz. The reason for the numeral setting will be described in details hereinlater.

When the acceleration sensor 300 receives an acceleration (G), the oscillation plate 312 is exerted with force (F) that induces oscillation of the oscillation plate 312 with its peripheral portion 312b peaked. The oscillation of the oscillation plate 312 causes the piezoelectric element 313 to be energized, thereby bringing about an electric signal indicative of a certain level of voltage. The cover assembly 340 has an output terminal 317b mounted thereon. The voltage level thus generated is then outputted from the detection electrodes 314a and 314b through the output terminal 317b to ensure that the acceleration is detected by the acceleration sensor 300.

The sensitivity $V_0$ of the acceleration sensor 300 is roughly in proportion to the square of the effective oscillation radius R of the oscillation plate 312 as described hereinbefore. This means that the oscillation plate 312 having a large effective oscillation radius R is advantageous. The resonance frequency $f_0$ is inclined to rise in response to the thickness $t_1$ of the oscillation plate 312 up to a certain extent as described hereinbefore. However, if the proportion $R_1/t1$ of the effective oscillation radius $R_1$ of the oscillation plate 312 with respect to the thickness t1 of the oscillation plate 312 goes beyond a certain threshold level, the oscillation plate 312 does not function as an oscillation plate any more, thereby causing the sensitivity $V_0$ and the resonance frequency $f_0$ to be lowered.

The proportion $R_1/t1$ of the effective oscillation radius $R_1$ of the oscillation plate 312 with respect to the thickness t1 of the oscillation plate 312 is therefore required to be maintained within a certain fluctuation range of 1.5 plus and minus from 3.3, i.e., given by the equation as follows, $$R_1/t1 = 3.3 \pm 1.5$$

The proportion $R_1/t1$ thus set ensures to have both the sensitivity $V_0$ and resonance $f_0$ enhanced. The reason that the fluctuation range should be specified in the range of 1.5 plus and minus from 3.3 will be described in more detail.

The acceleration sensor is operated under two different contradictory conditions consisting of a first condition that the sensitivity $V_0$ enhances as the diameter of the oscillation plate 312 increases and a second condition that the resonance frequency $f_0$ rises as the diameter of the oscillation plate 312 decreases. Accordingly, it is required to specify an optimal value for the resonance frequency $f_0$ appropriate for the acceleration sensor 300. The optimal resonance frequency $f_0$ will be estimated from measured pieces of data obtained through repeated experiments, hereinlater. The relationship between the resonance frequency $f_0$ and the flat portion $V_0$ of the output voltage range is as follows (the values may change to some extent depending on the output level $V_0$).

(1) The flat portion of the output voltage range should lie at a frequency in a range of less than 2 octaves (a quarter) of the resonance frequency $f_0$.
(2) The output voltage level at a frequency of 1 octave of the resonance frequency $f_0$ should lie in a range of +3 dB of the flat portion of the output voltage level.

In view of the case of (1), the resonance frequency $f_0$ is required to be 30 (kHz) in order to obtain the flat portion of the output voltage range at a frequency of, for instance, 15 (kHz), while the resonance frequency $f_0$ is required to be 20 (Hz) in order to obtain the flat portion of the output voltage range at a frequency of 10 (Hz).

In general, the acceleration sensor of the non-resonance type has the effective oscillation range of around 10 to 15 (kHz) or less actually used for detecting an acceleration. As a result, the output voltage level at a frequency in a range of 10 (kHz) or greater is required to form the flat portion. This leads to the fact that the resonance frequency $f_0$ is desirable to be 20 (kHz) or greater. The proportion of $R_1/t_1$ required to obtain optimal combination of $f_0$ and $V_0$ is determined through repeated measurements, which will be described hereinlater.

FIG. 6 shows constants of E (Young's modulus), ρ (density), and σ (Poisson's ratio) of the oscillation plate 312 and the piezoelectric element 313 obtained by the measurements.

As described hereinbefore, the resonance frequency $f_0$ of the oscillation plate in the form of a disc shape and securely mounted on the central portion of the fixed case member is calculated by the aforesaid equation (1).

[Eq. 1]

$$f_o = \alpha(t/R^2) \times \sqrt{E/\rho(1-\sigma^2)} \qquad (1)$$

where α is 0.172, t and R stand for thickness and radius of the oscillation plate, respectively.

The constants of E, ρ, and σ may change to some extent depending on the material of the oscillation plate 312 and the piezoelectric element 313. The change of the constants of E, ρ, and σ, however, will not significantly affect the inner value of the square root in the equation (1), i.e., $E/\rho(1-\sigma^2)$ as confirmed by the calculation of the inner value of the square root. As calculated from the equation (1), it is therefore understood that the resonance frequency $f_0$ is affected by the dimensions of constituting elements of the oscillation plate 312 rather than the aforesaid constants such as E, ρ, and σ.

The above factors $f_0$, t, R thus calculated may not completely satisfy the condition of the proportion of $R_1/t_1$, however, only to some extent.

Figure 7:
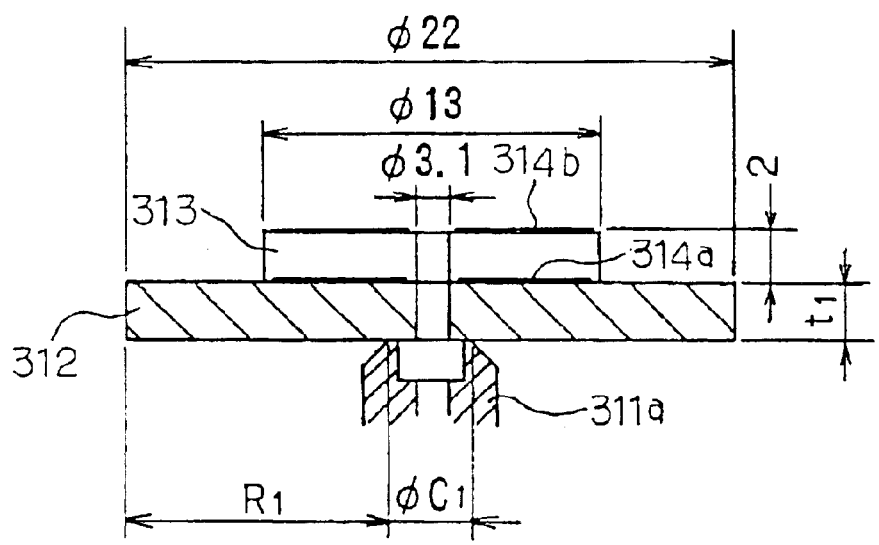
FIG. 7 is an enlarged cross-sectional view similar to FIG. 5 but showing the dimensions of the oscillation plate, the piezoelectric element, and the supporting portion forming parts of the acceleration sensor used for actual measurements.

FIG. 7 shows a sample of the supporting portion 311a, the oscillation plate 312, and the piezoelectric element 313 used for the measurements. The measurements were carried out with the diameter $\phi A_1$ of the oscillation plate 312 is 22 (mm), the outer diameter $\phi A_2$ of the piezoelectric element 313 is 13 (mm), the inner diameter $\phi B_2$ of the piezoelectric element is 3.1 (mm), and the thickness $t_2$ of the piezoelectric element 313 is 2 (mm).

Figure 8A:
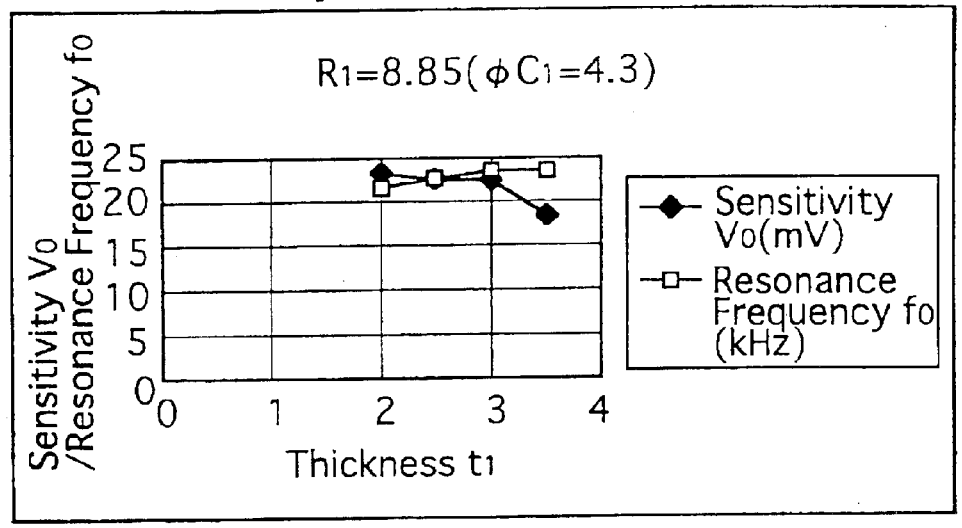
FIGS. 8A and 8B are graphs showing the relationship between the thickness $t_1$ and the sensitivity $V_0$/resonance frequency $f_0$.
Figure 8B:
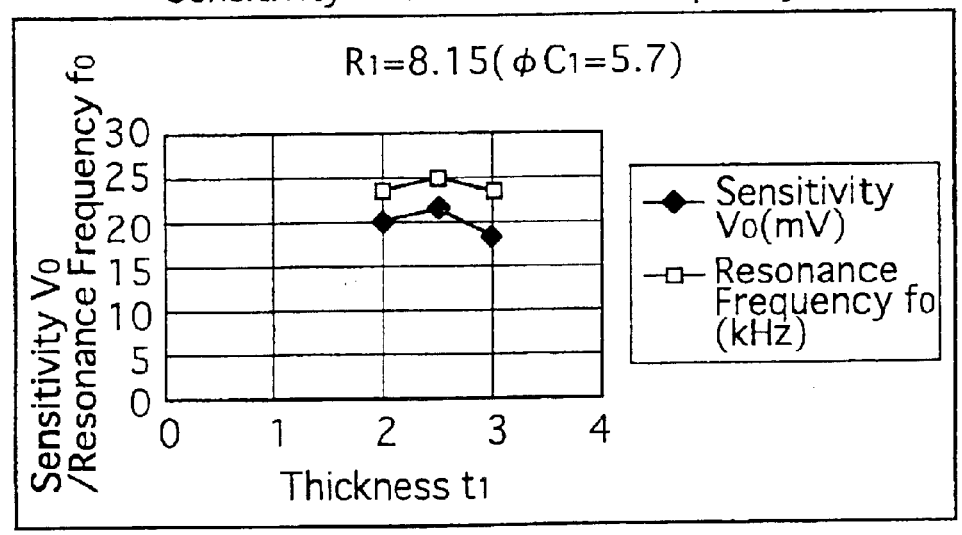

FIG. 8A shows the relationship between the thickness $t_1$ and the sensitivity $V_0$/resonance frequency $f_0$ obtained by the measurement performed under the condition that $R_1$=8.85 ($\phi C_1$=4.3 (mm)). FIG. 8B shows the relationship between the thickness $t_1$ and the sensitivity $V_0$/resonance frequency $f_0$ obtained by the measurement performed under the condition that $R_1$=8.15 ($\phi C_1$=5.7 (mm)).

From the measured pieces of data shown in FIGS. 8A and 8B, it is understood that $R_1/t_1$ should be around 3.3 in order to increase both of $V_0$ and $f_0$. In view of the effective oscillation frequencies available for detecting an acceleration, $R_1/t_1$ is estimated to be in a range of 3.3±1.5, even accepting the fact that the corresponding $V_0$ and $f_0$ may be reduced to a degree that can be tolerated.

From the measured pieces of data obtained through repeated experiments, it is also verified that maximum values of $V_0$ and $f_0$ will change depending on the diameter $\phi C_1$ of the supporting portion 311a, and that $f_0$ will neither satisfy the equation (1) nor increase after the thickness $t_1$ exceeds a certain value. This means that $f_0$ has a certain upper limit.

As will be seen from the foregoing description, the third embodiment of the acceleration sensor 300 comprises a fixed case member 311, a supporting portion 311a integrally formed with the fixed case member 311 and provided on the central bottom portion of the fixed case member 311, an oscillation plate 312 having a central portion 312a firmly connected with the supporting portion 311a, a piezoelectric element 313 provided on a surface of the oscillation plate 312 having upper and lower surfaces on which the electrodes 314a and 314b are securely mounted, and a cover assembly 340 having an output terminal 317b mounted thereon and electrically connected with the first electrode 314b to output an electric signal from the electrode 314b. The thickness and the effective oscillation radius of the oscillation plate 312 of the acceleration sensor 300 is $t_1$ and $R_1$, respectively. The acceleration sensor 300 is designed in a manner that the proportion $R_1/t_1$ is maintained in a fluctuation range of 1.5 plus and minus from 3.3, thereby making it possible to keep the resonance frequency $f_0$ of the oscillation plate 312 including the piezoelectric element 313 in a range of 20 kHz or greater. This leads to the fact that the sensitivity $V_0$ and the resonance frequency $f_0$ of the acceleration sensor 300 is optimized and the performance of the acceleration sensor 300 is enhanced.

The foregoing third embodiment of the acceleration sensor 300 can be replaced by a fourth embodiment of the acceleration sensor 300 in order to improve the performance of the acceleration sensor 300.

The third embodiment of the acceleration sensor 300 can be modified as a fourth embodiment of the acceleration sensor 300 in a manner that that the dimensions of the oscillation plate 312, the piezoelectric element 313 and the supporting portion 311a of the fixed case member 311 are modified. The fourth embodiment of the acceleration sensor 300 as a modification of the third embodiment of the acceleration sensor 300 will be described hereinafter. The constitutional elements and parts of the fourth embodiment of the acceleration sensor 300 same as those of the third embodiment of the acceleration sensor 300 are simply represented by the same reference numerals as those of the third embodiment of the acceleration sensor 300, and will be thus omitted from description for avoiding tedious repetition.

Referring to FIGS. 4 to 5 of the drawings, there is shown a fourth preferred embodiment of the acceleration sensor 300 according to the present invention.

In the fourth embodiment of the acceleration sensor 300, the piezoelectric element 313 has a radially outer end 313c as shown in FIG. 5. The peripheral portion 312b of the oscillation plate 312 has a radially inner end 312d. Assuming that the length between the radially outer end 313c of the piezoelectric element 313 and the radially inner end 312d of the oscillation plate 312 is $R_2$ (mm). $R_2$ (mm) is equal to 0.5 plus minus 0.25, multiplied by $R_1$ (mm), i.e., given in the equation as follows:

$$R_2=(0.5\pm0.25)R_1$$

The reason for the above equation will be described hereinlater in detail.

The calculated values of $E/\rho(1-\sigma^2)$ of the oscillation plate 312, which is made of nickel steel, and the piezoelectric element 313 are as follows.

Nickel steel . . . $5.28\times10^3$ Piezoelectric element . . . $3.05\times10^3$ As the results of the calculation from the equation (1), the inner value of the square root in the equation (1), i.e., $E/\sigma(1-\sigma^2)$ of the piezoelectric element 313 is less than that of the oscillation plate 312, which is made of nickel steel.

From the above calculation, it is derived that the resonance frequency of the piezoelectric element 313 is approximately 0.578 times as high as that of the oscillation plate 312, provided that the oscillation plate 312 and the piezoelectric element 313 have the same dimension. This means that the resonance frequency of the piezoelectric element 313 tends to be lower than that of the oscillation plate 312. This leads to the fact that the relatively low resonance frequency of the piezoelectric element 313 will cause to decrease the resonance frequency $f_0$ of the oscillation body consisting of the oscillation plate 312 and the piezoelectric element 313.

The factor $R_2$ is calculated in accordance with the equation (1) under the condition that the thickness $t_1$ of the oscillation plate 312 is equal to the thickness $t_2$ of the piezoelectric element 313 and the oscillation plate 312 and the piezoelectric element 313 have the same resonance frequency $f_0$ as follows.

[Eq. 2]

$$R_2=\sqrt{0.578}R_1 \qquad (2)$$

Accordingly, it is derived that $R_2$ of the piezoelectric element 313 is approximately 0.76 times as large as $R_1$ of the oscillation plate 312. In addition, the resonance frequency of the piezoelectric element 313 is required to be twice as high as that of the oscillation plate 312 so that the resonance frequency of the piezoelectric element 313 will not affect that of the oscillation plate 312. $R_2$ of the piezoelectric element 313 satisfying the above condition is calculated as below.

[Eq. 3]

$$R_2 = \sqrt{0.578/2}R_1 \quad (3)$$

Accordingly, it is derived that $R_2$ of the piezoelectric element 313 is approximately 0.538 times as large as $R_1$ of the oscillation plate 312.

On the other hand, the sensitivity $V_0$ is given in accordance with the following equation as described hereinbefore.

$$V_0 = Q/C$$

where Q stands for electrical charge, and C stands for capacitance.

The piezoelectric element 313 receives stress on the central area 313d more than on the peripheral area 313f as shown in FIG. 5. The piezoelectric element 313 is therefore considered to generate electrical charge on the central area 313d more than on the peripheral area 313f. The capacitance C increases on the peripheral area 313f. For the above reasons, it is inferred that the sensitivity $V_0$ is decreased on the peripheral area 313f of the piezoelectric element 313 as shown in FIG. 5. The outer diameter of the piezoelectric element 313 is accordingly desirable to be shortened to enhance the sensitivity $V_0$.

As a result of the foregoing description, it is concluded that the outer diameter of the piezoelectric element 313 should be smaller than that of the oscillation plate 312 in order to improve the performance.

Figure 9:
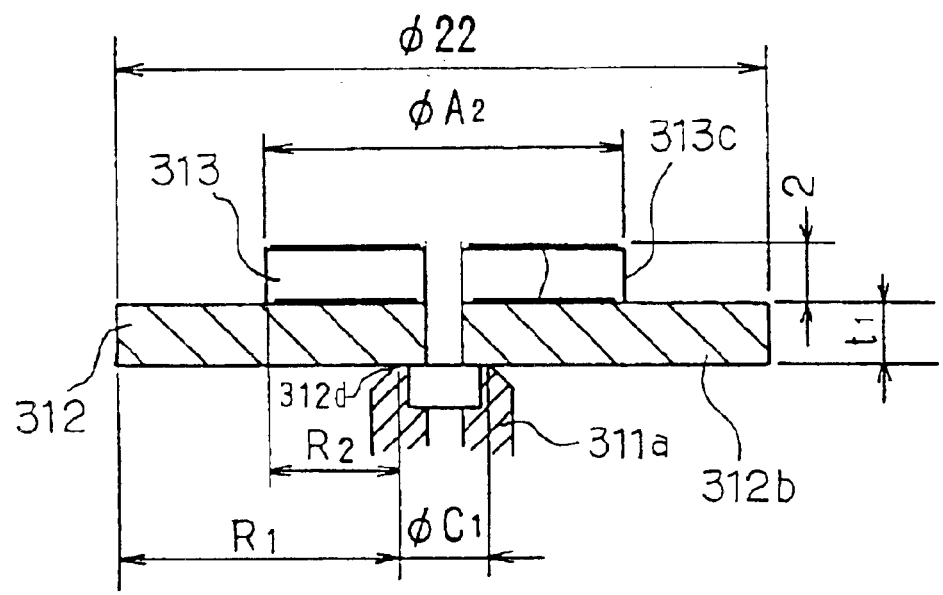
FIG. 9 is an enlarged cross-sectional view similar to FIG. 5 but showing the dimensions of the oscillation plate, the piezoelectric element, and the supporting portion forming parts of the acceleration sensor used for actual measurements.
Figure 10A:
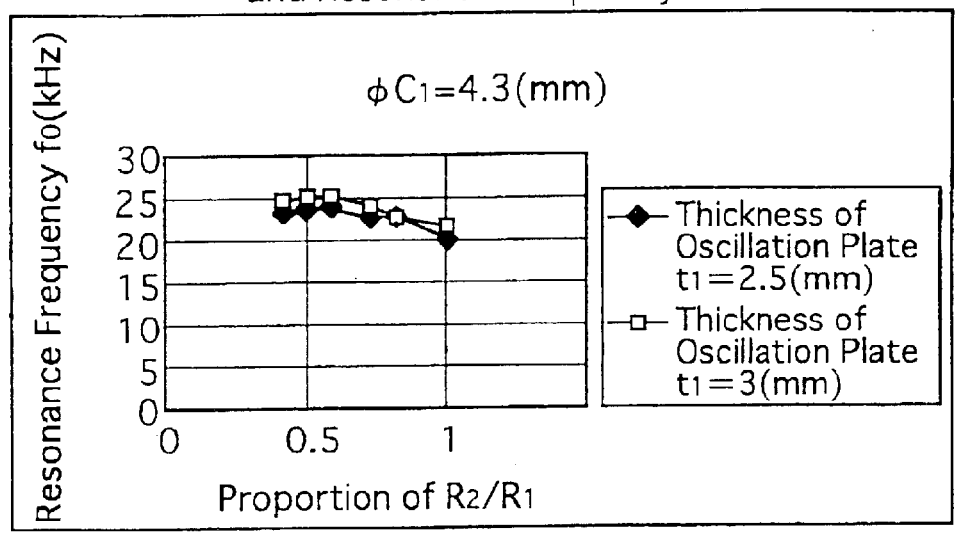
FIGS. 10A and 10B are graphs showing the relationship between the proportion of $R_2/R_1$ and the resonance frequency $f_0$.
Figure 10B:
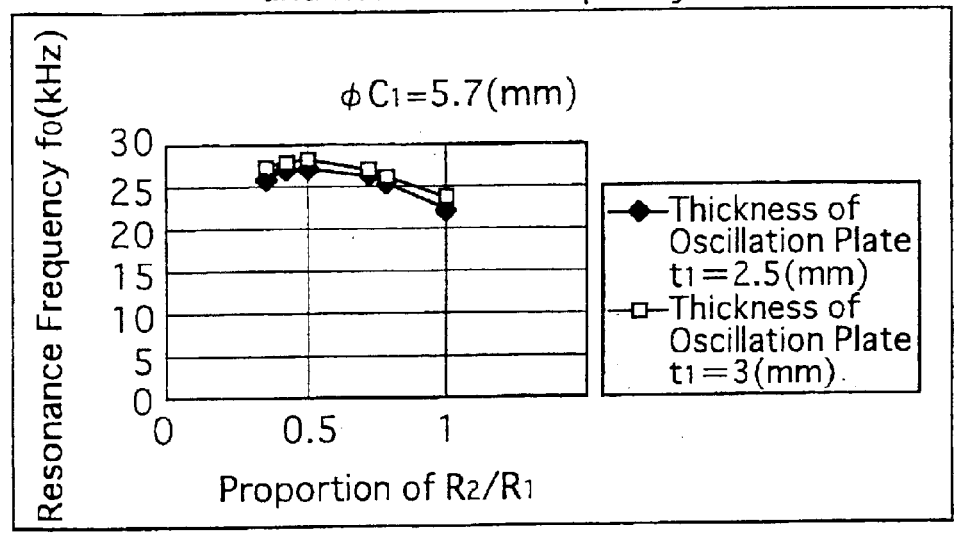

FIGS. 10A and 10B shows the relationship between the proportion of $R_2/R_1$ and the resonance frequency $f_0$ obtained by the measurement performed under the condition that the outer diameter $\phi A_1$ of the oscillation plate 312 is 22 (mm) and the thickness $t_2$ of the piezoelectric element 313 is 2 (mm) as shown in FIG. 9. In FIG. 10A, $R_1$ is 8.85 ($\phi C_1$=4.3 (mm)), and in FIG. 10B, $R_1$ is 8.15 ($\phi C_1$=5.7 (mm)). As seen from FIG. 10, $R_2 < 0.75\, R_1$ is desirable in order to increase the resonance frequency $f_0$.

Figure 11:
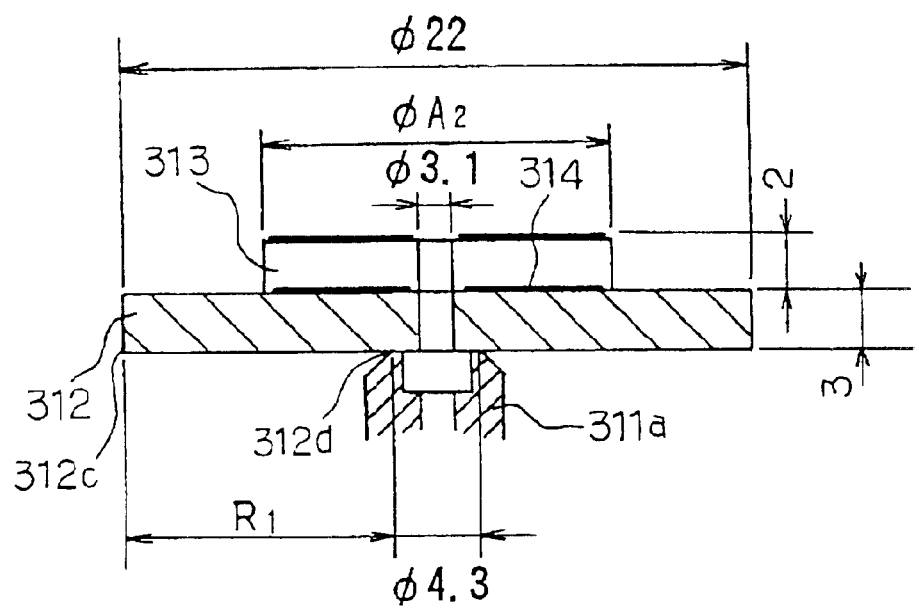
FIG. 11 is an enlarged cross-sectional view similar to FIG. 5 but showing the dimensions of the oscillation plate, the piezoelectric element, and the supporting portion forming parts of the acceleration sensor used for actual measurements.
Figure 12:
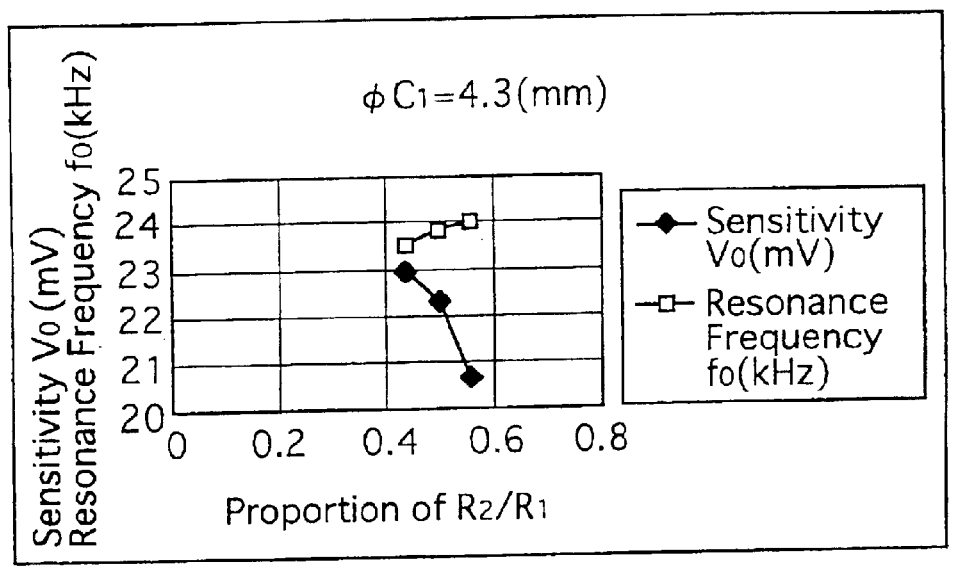
FIG. 12 is a graph showing the relationship between the proportion of $R_2/R_1$ and the sensitivity $V_0$/the resonance frequency $f_0$.

In order to determine the maximum value of the sensitivity $V_0$, the sensitivity $V_0$ is measured under the condition that the thickness $t_1$ of the oscillation plate 312 is 3 (mm), the thickness $t_2$ of the piezoelectric element 313 is 2 (mm), and the diameter $\phi C_1$ of the supporting portion 311 a is 4.3 (mm) as shown in FIG. 11. FIG. 12 shows the relationship between the proportion of $R_2/R_1$ and the sensitivity $V_0$/the resonance frequency $f_0$ obtained by the measurement. As seen from FIG. 12, $R_2$ is desirable to be 0.4 to 0.5 multiplied by $R_1$ in order to increase the resonance frequency $f_0$.

From the foregoing description, it is concluded that $R_1$ and $R_2$ are desirable to satisfy the equation as follows.

$$R_2 = (0.5 \pm 0.25)R_1$$

where $R_1$ (mm) is the effective oscillation radius measured between the inner end 312d and outer end 312c of the peripheral portion 312b of the oscillation plate 312, and $R_2$ (mm) is the length between the radially outer end 313c of the piezoelectric element 313 and the radially inner end 312d of the oscillation plate 312.

The fourth embodiment of the acceleration sensor 300 thus constructed can enhance both the resonance frequency $f_0$ and the sensitivity $V_0$, thereby making it possible to improve the performance of the acceleration sensor 300.

The fourth embodiment of the acceleration sensor 300 has, however, a drawback that the adhesive area between the piezoelectric element 313 and the oscillation plate 312 is curtailed, thereby causing the adhesive strength between the piezoelectric element 313 and the oscillation plate 312 to be unevenly distributed and weakened.

The foregoing third and fourth embodiments of the acceleration sensor 300 can be replaced by a fifth embodiment of the acceleration sensor 300 in order to improve the performance of the acceleration sensor 300.

The third and fourth embodiments of the acceleration sensor 300 can be modified as a fifth embodiment of the acceleration sensor 300 in a manner that that the dimensions of the oscillation plate 312, the piezoelectric element 313 and the supporting portion 311a of the fixed case member 311 are modified. The fifth embodiment of the acceleration sensor 300 as a modification of the third and fourth embodiments of the acceleration sensor 300 will be described hereinafter. The constitutional elements and parts of the fifth embodiment of the acceleration sensor 300 same as those of the third embodiment of the acceleration sensor 3100 are simply represented by the same reference numerals as those of the third embodiment of the acceleration sensor 300, and will be thus omitted from description for avoiding tedious repetition.

Referring to FIGS. 4 and 5 of the drawings, there is shown a fifth preferred embodiment of the acceleration sensor 300 according to the present invention. In the fifth embodiment of the acceleration sensor 300, the supporting portion 311a of the fixed case member 311 has a cylindrical section 311i and a forward tapered section 311j integrally formed with the cylindrical section 311i and in the form of a truncated cone shape as shown in FIG. 5. The forward tapered section 311j has a top surface 311k securely held in contact with the second surface of the oscillation plate 312 and has an outer end edge 311l in axially alignment with the outer peripheral end 312c of the peripheral portion 312b of the oscillation plate 312. The outer end edge 311l has a diameter $\phi C_1$ (mm). The piezoelectric element 313 is in the form of an annular shape to have an inner diameter $\phi B_2$ (mm). The inner diameter $\phi B_2$ (mm) of the annular shape of the piezoelectric element 313 is approximately equal to or greater than the diameter $\phi C_1$ (mm) of the outer end edge 311l of the top surface 311k of the supporting portion 311a.

In the fifth embodiment of the acceleration sensor 300, the piezoelectric element 313 in the form of a doughnut and disc shape is mounted on the oscillation plate 312 under the condition the inner diameter $\phi B_2$ (mm) of the piezoelectric element 313 is optimized, in other words, the inner diameter $\phi B_2$ (mm) of the piezoelectric element 313 is approximately equal to or greater than the diameter $\phi C_1$ (mm) of the supporting portion of the oscillation plate 312.

FIG. 14 shows the relationship between the sensitivity $V_0$/the resonance frequency $f_0$ and the inner diameter $\phi B_2$ (mm) of the piezoelectric element 313, with respect to the diameter $\phi C_1$ (mm) of the supporting portion 311a obtained by the measurement performed under the condition that the outer diameter $\phi A_1$ (mm) of the oscillation plate 312 is 22.

As shown in FIG. 14, the inner diameter $\phi B_2$ (mm) of the piezoelectric element 313 is desirable to be approximately equal to or greater than the diameter $\phi C_1$ (mm) of the supporting portion of the oscillation plate 312 in order to improve the sensitivity $V_0$, even accepting the fact that the resonance frequency $f_0$ may be reduced to a degree that can be tolerated. In addition, as the inner diameter of the piezoelectric element 313, $\phi B_2$, increases, the electrical charge Q tends to increase (not shown). The inner diameter of the piezoelectric element 313, $\phi B_2$, accordingly, can increase only up to a certain limit since the adhesive area is decreased and the sensitivity $V_0$ is deteriorated.

As will be seen from the foregoing description, the fifth embodiment of the acceleration sensor 300 has a piezoelectric element 313 in the form of an annular shape mounted on the oscillation plate 312 under the condition that the inner diameter $\phi B_2$ (mm) of the piezoelectric element 313 is approximately equal to or greater than the diameter $\phi C_1$ (mm) of the supporting portion of the oscillation plate 312, thereby making it possible to enhance the sensitivity $V_0$, even accepting the fact that the electrical charge Q is increased and the resonance frequency $f_0$ is lowered to a degree that can be tolerated.

The foregoing third to fifth embodiments of the acceleration sensor 300 can be replaced by a sixth embodiment of the acceleration sensor 300 in order to improve the performance of the acceleration sensor 300.

The third to fifth embodiments of the acceleration sensor 300 can be modified as a sixth embodiment of the acceleration sensor 300 in a manner that that the dimensions of the oscillation plate 312, the piezoelectric element 313 and the supporting portion 311a of the fixed case member 311 are modified. The sixth embodiment of the acceleration sensor 300 as a modification of the third to fifth embodiments of the acceleration sensor 300 will be described hereinafter. The constitutional elements and parts of the sixth embodiment of the acceleration sensor 300 same as those of the third embodiment of the acceleration sensor 300 are simply represented by the same reference numerals as those of the third embodiment of the acceleration sensor 300, and will be thus omitted from description for avoiding tedious repetition.

Referring to FIGS. 4 and 5 of the drawings, there is shown a sixth preferred embodiment of the acceleration sensor 300 according to the present invention.

In the sixth embodiment of the acceleration sensor 300, the piezoelectric element 313 has a thickness $t_2$. The thickness $t_1$ (mm) of the oscillation plate 312 is approximately equal to the thickness $t_2$ (mm) of the piezoelectric element 313, or the ratio of the thickness $t_1$ (mm) of the oscillation plate 312 to the thickness $t_2$ of the piezoelectric element 313 is within a fluctuation range of 0.5 to 3 as shown 5.

In the sixth embodiment of the acceleration sensor 300 thus constructed, the thickness $t_1$ of the oscillation plate and the thickness $t_2$ of the piezoelectric element are optimized.

FIG. 15 shows the relationship between the sensitivity $V_0$/the resonance frequency $f_0$, and the proportion $t_1/t_2$ of the thickness $t_1$ of the oscillation plate 312 with respect to the thickness $t_2$ of the piezoelectric element 313 obtained by measurements.

As shown in FIG. 15, the proportion $t_1/t_2$ is desirable to be approximately equal to one ($t_1=t_2$) or in a range of 0.5 to 3 in order to obtain an optimized combination of $f_0$ and $V_0$.

As will be seen from the foregoing description, the sixth embodiment of the acceleration sensor 300 has a piezoelectric element 313 in the form of an annular shape mounted on the oscillation plate 312 under the condition that the thickness $t_1$ (mm) of the oscillation plate 312 is approximately equal to the thickness $t_2$ (mm) of the piezoelectric element 313, or the ratio of the thickness $t_1$ (mm) of the oscillation plate 312 to the thickness $t_2$ of the piezoelectric element 313 is within a fluctuation range of 0.5 to 3, thereby making it possible to obtain an optimized combination of the sensitivity $V_0$ and the resonance frequency $f_0$.

The foregoing third to sixth embodiments of the acceleration sensor 300 may be replaced by a seventh embodiment of the acceleration sensor 300 in order to improve the performance of the acceleration sensor 300. The third to sixth embodiments of the acceleration sensor 300 can be modified as a seventh embodiment of the acceleration sensor 300 in a manner that that the dimensions of the oscillation plate 312, the piezoelectric element 313 and the supporting portion 311a of the fixed case member 311 are modified. The seventh embodiment of the acceleration sensor 300 as a modification of the third to sixth embodiments of the acceleration sensor 300 will be described hereinafter The constitutional elements and parts of the seventh embodiment of the acceleration sensor 300 same as those of the third embodiment of the acceleration sensor 300 are simply represented by the same reference numerals as those of the third embodiment of the acceleration sensor 300, and will be thus omitted from description for avoiding tedious repetition.

Figure 16:
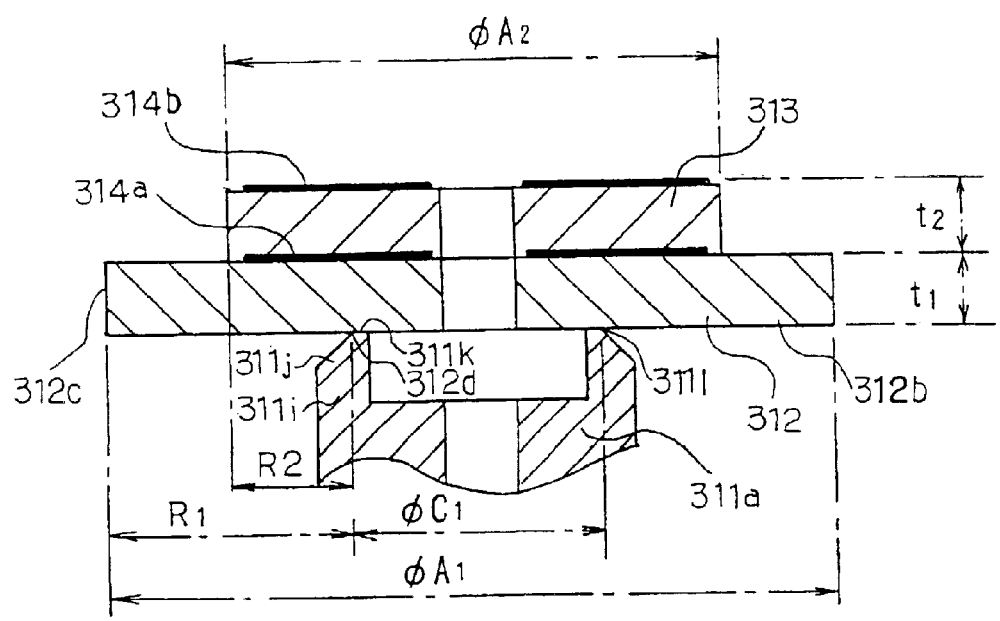
FIG. 16 is an enlarged cross-sectional view similar to FIG. 5 but showing the dimensions of the oscillation plate, the piezoelectric element, and the supporting portion forming parts of the seventh embodiment of the acceleration sensor.

Referring to FIGS. 4 and 16 of the drawings, there is provided a seventh preferred embodiment of the acceleration sensor 300 according to the present invention. The seventh embodiment of the acceleration sensor 300 is shown in FIG. 4 as comprising a sensor casing 350 having a center axis and to be positioned in coaxial alignment with the oscillation direction to receive the acceleration. The sensor casing 350 includes a cylindrical fixed case member 311 having a supporting portion 311a axially extending, and a cover assembly 340 provided on the fixed case member 311 to cover the fixed case member 311 to define a closed space 360.

The acceleration sensor 300 further comprises an oscillation plate 312 accommodated in the closed space 360 of the sensor casing 350 and has a central portion 312a supported by the supporting portion 311a of the fixed case member 311, and a peripheral portion 312b integrally formed with the central portion 312a and extending radially outwardly of the central portion 312a to be freely movable with respect to the supporting portion 311a of the fixed case member 311. The oscillation plate 312 is adapted to be partly oscillatable along the center axis with respect to the fixed case member 311.

The acceleration sensor 300 further comprises a piezoelectric element 313 held in contact with the oscillation plate 312 to generate a voltage indicative of the acceleration when the acceleration is exerted on the sensor casing 350 to have the oscillation plate 312 partly oscillated along the center axis with respect to the sensor casing 350 with the peripheral portion 312b of the oscillation plate 312 being deformed. The piezoelectric element 313 has first and second electrodes 314a and 314b having the voltage indicative of the acceleration to output therethrough. The oscillation plate 312 and the piezoelectric element 313 are adapted to be integrally oscillatable within a range of effective oscillation frequencies.

The acceleration sensor 300 further comprises at least one terminal pin 317b extending through the cover assembly 340 and terminating at the exterior of the cover assembly 340. The terminal pin 317b is adapted to be electrically connected with the second electrode 314b.

Figure 31A:
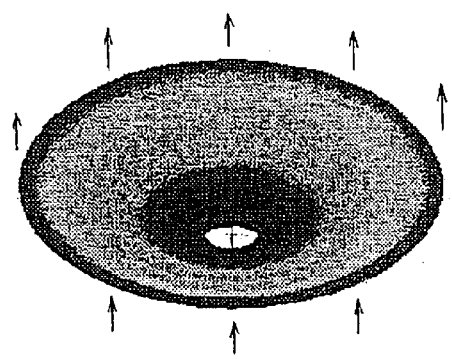
FIGS. 31A, 31B, and 31C are diagrams showing oscillation plates oscillating in the 1/2 oscillation mode, in the 1/2 oscillation mode, and in the 1/4 oscillation mode, respectively.
Figure 31B:
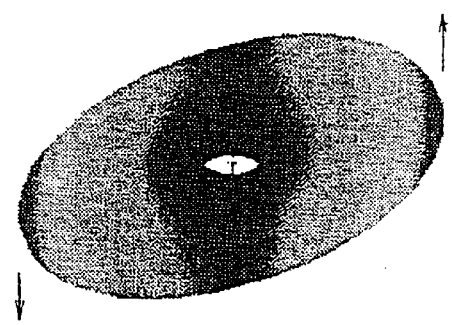
Figure 31C:
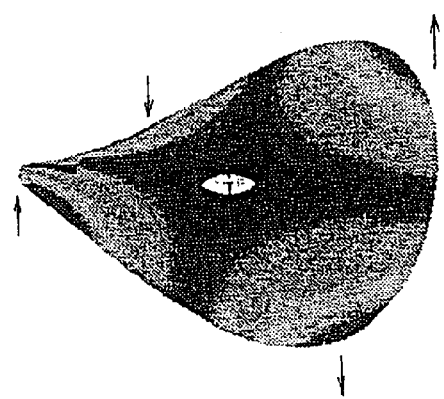

In the seventh embodiment of the acceleration sensor 300, the oscillation plate 312 and the piezoelectric element 313 are integrally oscillatable in two different modes consisting of: a 1/1 oscillation mode where the oscillation plate 312 is irregularly deformed to have the peripheral portion 312b oscillated with a single vector in the oscillation direction of the oscillation plate 312 when the oscillation plate 312 is oscillated with respect to the fixed case member 311 at a resonance frequency $f_0$ (see FIG. 31A); and a 1/2 oscillation mode where the oscillation plate 312 is irregularly deformed to have two different half parts of the peripheral portion 312b oscillated with their respective different vectors opposite to each other in the oscillation direction of the oscillation plate 312 when the oscillation plate 312 is oscillated with respect to the fixed case member 311 at a noise frequency $f_01$ (see FIG. 31B), and the resonance frequency $f_0$ and the noise frequency $f_0 1$ are out of the range of effective oscillation frequencies. The 1/1 oscillation mode and 1/2 oscillation mode are hereinlater referred to as "the first oscillation mode" and "the second oscillation mode", respectively.

As described hereinbefore, the oscillation of the oscillation plate 312 in the first or second oscillation mode introduces spurious of the acceleration sensor 300, which causes errors in detecting an acceleration. It is therefore required that the resonance frequency $f_0$ and the noise frequency $f_0 1$ are out of the range of effective oscillation frequencies actually used for detecting an acceleration in order to improve the performance of the acceleration sensor.

The dimensions of the acceleration sensor 300 will be described hereinlater.

As shown in FIG. 16, the supporting portion 311a of the fixed case member 311 of the acceleration sensor 300 has a cylindrical section 311i and a forward tapered section 311j integrally formed with the cylindrical section 311i and in the form of a truncated cone shape. The forward tapered section 311j has a top surface 311k securely held in contact with the second surface of the oscillation plate 312 and has an outer end edge 311l in axially alignment with the outer peripheral end 312c of the peripheral portion 312b of the oscillation plate 312. The outer end edge 311l has a diameter $\phi C_1$ (mm), and the oscillation plate 312 has an effective oscillation radius $R_1$ (mm) measured between the inner end 312d and outer end 312c of the peripheral portion 312b of the oscillation plate 312.

The oscillation plate 312 and the piezoelectric element 313 are adapted to be integrally oscillatable in the first and second oscillation modes with $\phi C_1$ (mm)/$R_1$ (mm) and $f_0 1/f_0$ given in the following equations:

$$\phi C_1 \text{ (mm)}/R_1 \text{ (mm)} > 0.92, \text{ and} \quad \text{equation (2)}$$

$$f_0 1/f_0 \geq 0.52 \quad \text{equation (3)}$$

The following description will be directed to how to determine the dimensions of the constitutional elements and parts forming part of the seventh embodiment of the acceleration sensor 300 in order to have the resonance frequency $f_0$ and the noise frequency $f_0 1$ out of the range of effective oscillation frequencies actually used for detecting an acceleration.

Experiments were carried out to check the occurrence of noise, i.e., spurious with respect to the dimensions of the oscillation plate 312 and the piezoelectric element 313 changed under the condition that the thickness $t_1$ of the oscillation plate 312 and the thickness $t_2$ of the piezoelectric element 313 are 2 (mm). The occurrence of spurious due to the 1/2 oscillation mode is checked at a frequency of 15 kHz, which is an upper limit of the range of effective oscillation frequencies actually used for detecting an acceleration. The dimensions of the oscillation plate 312 and the piezoelectric element 313 changed are the outer diameter $\phi A_1$, of the oscillation plate 312, the outer diameter $\phi A_2$ of the piezoelectric element 313, and the diameter $\phi C_1$ of the supporting portion 311a.

FIG. 17 shows a table showing the result of the experiments. The legends appearing with "○" (pass) and "X" (fail) in the table are respectively intended to mean that spurious was eliminated or not, respectively.

As shown in FIG. 17, the occurrence of the spurious due to the 1/2 oscillation mode is not recognized under a condition that $\phi C_1$ (mm)/$R_1$ (mm) is equal to or greater than 0.92, and $f_0 1/f_0$ is equal to or greater than 0.52.

This result from the fact that the diameter $\phi C_1$ of the supporting portion 311a is enlarged, thereby making it possible for the supporting portion 311a to steadily support the oscillation plate 312 and the piezoelectric element 313 to prevent the oscillation plate 312 and the piezoelectric element 313 from oscillating in the second oscillation mode, i.e., the 1/2 oscillation mode at a frequency in the range of effective oscillation frequencies actually used for detecting an acceleration. This means that the noise frequency $f_0 1$ can be moved out of the range of effective oscillation frequencies actually used for detecting an acceleration.

Figure 19:
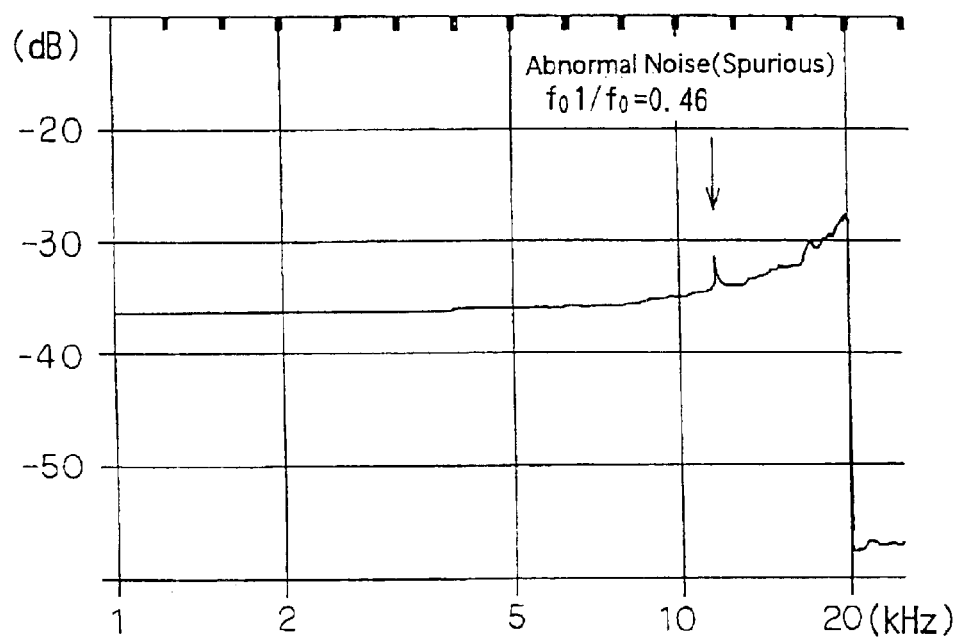
FIG. 19 is a graph showing the result of experiments performed to prove whether spurious is eliminated or not.
Figure 20:
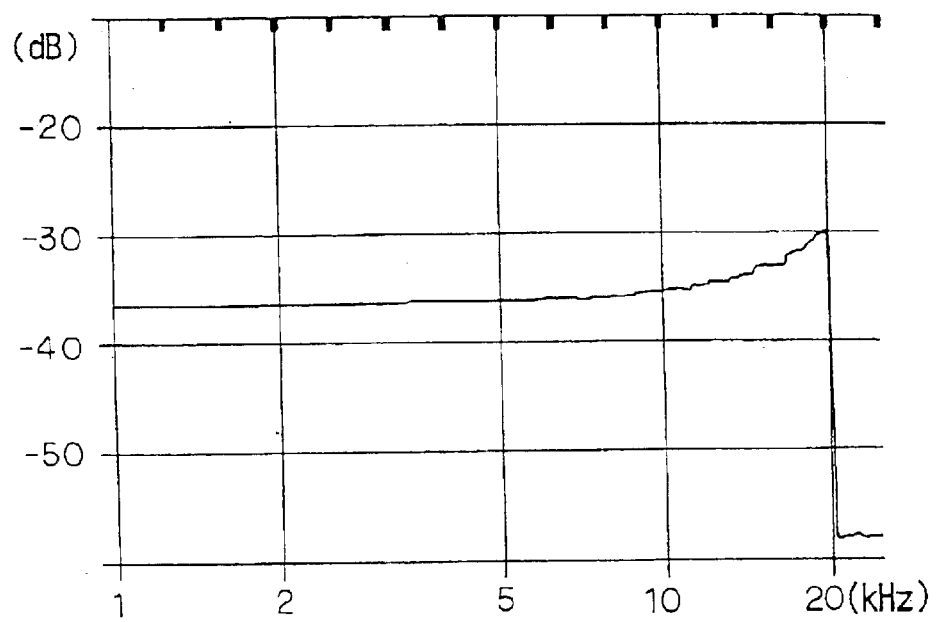
FIG. 20 is a graph showing the result of experiments performed to prove whether spurious is eliminated or not.
Figure 21:
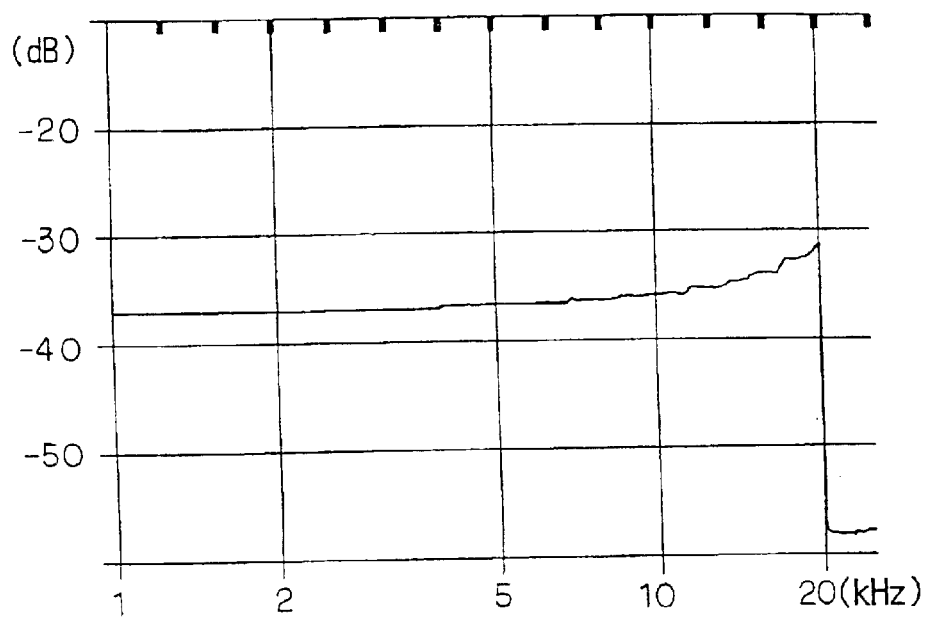
FIG. 21 is a graph showing the result of experiments performed to prove whether spurious is eliminated or not.

Another experiments were carried out to measure the frequency characteristics with the diameter $\phi C_1$ of the supporting portion 311a specified. FIG. 18 shows the result of the experiments performed with $\phi C_1$ of 4.2 (mm), FIG. 19 shows the result of the experiments performed with $\phi C_1$ of 5.7 (mm), FIG. 20 shows the result of the experiments performed with $\phi C_1$ of 6.3 (mm), and FIG. 21 shows the result of the experiments performed with $\phi C_1$ of 7.3 (mm). As seen from FIGS. 20 and 21, spurious was eliminated with $\phi C_1/R_1$ of 0.92 and $\phi C_1/R_1$ of 1.15. This leads to the fact that the performance of the acceleration sensor 300 is improved.

In the acceleration sensor 300, the oscillation plate 312 and the piezoelectric element 313 are mounted on the supporting portion 311a of the fixed case member 311 with the center axes of the oscillation plate 312 and the piezoelectric element 313 held in axial alignment with the center axis of the supporting portion 311a of the fixed case member 311 so as to detect an acceleration. Unlike the third conventional acceleration sensor 120 shown in FIG. 29, the acceleration sensor 300 is not required to have a weight and a fastening screw. The acceleration sensor 300 is therefore of high performance and simple in construction, thereby making it possible to automatically assemble the acceleration sensor 300, and reduce the production cost of the acceleration sensor 300.

According to the present invention, the resonance frequency $f_0$ of the oscillation plate involving the piezoelectric element can be maintained in a range of around 20 kHz or greater to obtain an optimized combination of the sensitivity $V_0$ and the resonance frequency $f_0$, thereby making it possible to enhance the performance of the acceleration sensor.

In the acceleration sensor 300, the fixed case member 311 and the oscillation plate 312 are each made of an electroconductive material to ensure that the first electrode 314a is electrically connected with the oscillation plate 312 and the fixed case member 311, thereby making it possible for the fixed case member 311 to serve as a ground.

The acceleration sensor 300, furthermore, comprises a fixed case member 311 having a screw portion 311e to be screwed to an exterior object, which is to receive the acceleration to ensure that the oscillation plate 312 is oscillated with respect to the fixed case member 311 when the exterior object is oscillated.

The oscillation plate 312 of the acceleration sensor 300 is adapted to be oscillatable with the resonance frequency $f_0$ of 20 kHz or greater, and the range of effective oscillation frequencies between 0 and 15 kHz, thereby making it possible to have the resonance frequency $f_0$ out of the range of effective oscillation frequencies actually used for detecting an acceleration. As will be understood from the foregoing description, the acceleration sensor 300 thus constructed can enhance both the resonance frequency $f_0$ and the sensitivity $V_0$, thereby making it possible to improve the performance of the acceleration sensor 300.

The previously mentioned third to seventh embodiments of the acceleration sensor 300 has various modifications.

Any one of the third to seventh embodiments of the acceleration sensor 300 can be replaced by one modification in order to attain the above objects of the present invention.

Figure 22:
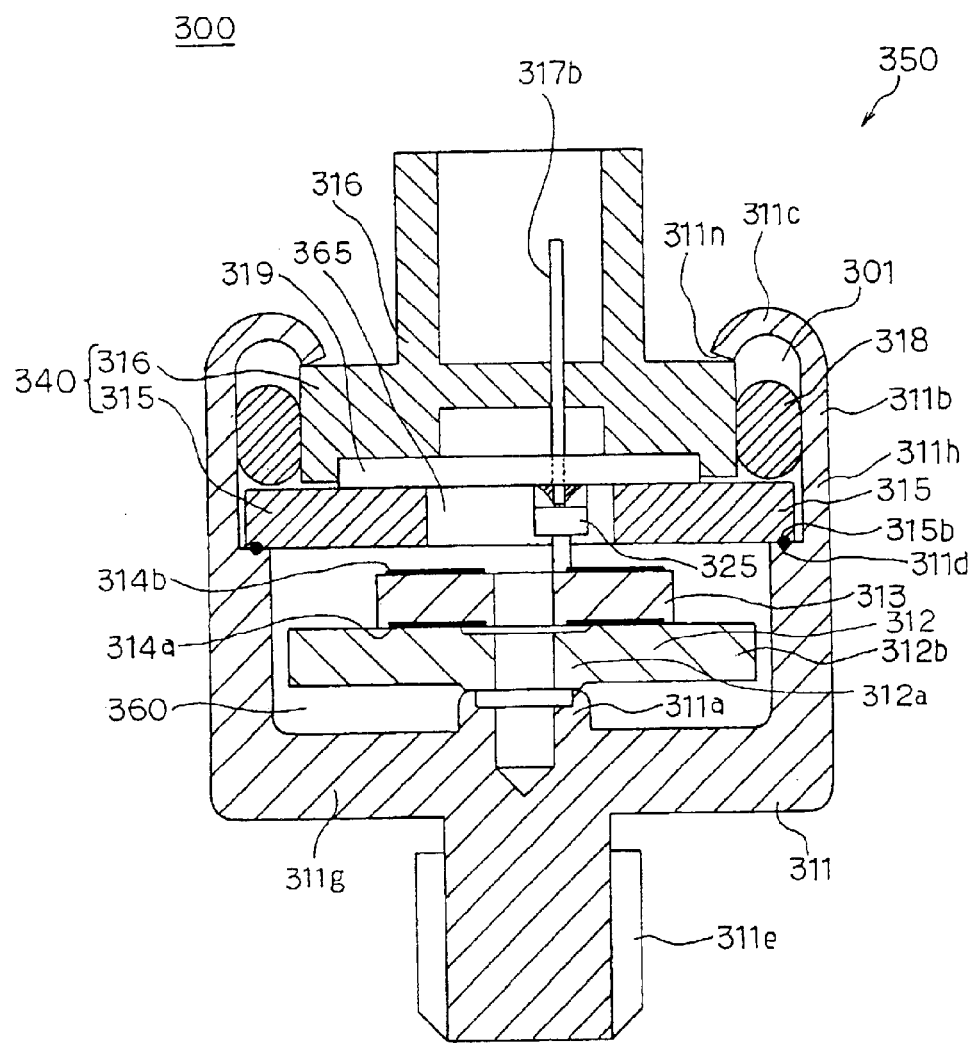
FIG. 22 is a cross-sectional view showing a modification of any one of the third to seventh embodiments of the acceleration sensor according to the present invention.

The modification of third to seventh embodiments of the acceleration sensor 300 is shown in FIG. 22. In the modification of the acceleration sensor 300 according to the present invention, for instance, the cover assembly 340 comprises a metal base member 315 made of an electroconductive material and a cover member 316 made of an insulating material. The metal base member 315 has a peripheral end portion 315b secured to part 311d of the fixed case member 311 with the closed space 360 defined by the metal base member 315 and the fixed case member 311. The cover member 316 is mounted on the metal base member 315, and the terminal pin 317b extends through the metal base member 315 and the cover member 316 to be electrically connected with the second electrode 314b of the piezoelectric element 313.

The modification of the acceleration sensor 300 according to the present invention comprises a printed board 319 retained by the cover assembly 340 to have the second electrode 314b of the piezoelectric element 313 and the terminal pin 317b connected with each other. The metal base member 315 of the acceleration sensor 300 is formed with a central hole 365, and the terminal pin 317b has a contacting rod portion 325 projected from the printed board 319 and extends through the central hole 365 of the metal base member 315 to project into the closed space 360 in electrical connection with the second electrode 314b of the piezoelectric element 313. The metal base member 315 may have a peripheral end portion 315b welded to part 311d of the fixed case member 311.

In the modification of the acceleration sensor 300, the fixed case member 311 has a large diameter portion 311b, a small diameter portion 311c, and an annular ledge portion 311d having the large and small diameter portions 311b, 311c integrally formed with each other to have the peripheral end portion 315b of the metal case member 315 firmly mounted thereon and welded thereto. The small diameter portion 311c has an open peripheral edge 311n inwardly bent to be firmly engaged with the second surface of the cover member 316. The cylindrical side portion 311h of the fixed case member 311 is larger in diameter than the cover member 316 to form an annular gap 301 between the inner surface of the small diameter portion 311c of the fixed case member 311 and the outer peripheral end surface of the cover member 316, and which further comprises a resilient ring 318 disposed in the annular gap 301 and rested on the metal base member 315 to have the closed space 360 hermetically sealed. The resilient ring 318 may be made of an O-ring. The metal base member 315 may have a peripheral end portion 315b welded to part of the fixed case member 311.

In the modification of the acceleration sensor 300, the fixed case member 315 and the oscillation plate 312 are each made of an electroconductive material to ensure that the first electrode 314a is electrically connected with the oscillation plate 312 and the fixed case member 311, which serves as a ground. In the modification of the acceleration sensor 300 thus constructed, the metal base member 315, the cover member 316, and the fixed case member 311 can be securely mounted by way of an automatic assembly device, makes it easy for the modification of the acceleration sensor 300 to be automatically assembled. This leads to the fact that the modification of the acceleration sensor 300 are of high performance and appropriate for automatic production at a low cost.

While there has been described about the third to seventh embodiments and their modifications of the acceleration sensor 300 which comprises one piezoelectric element 313 mounted on one surfaces of the oscillation plate 312, two piezoelectric elements may be mounted on the both surfaces of the oscillation plate 312 according to the present invention. The foregoing third to seventh embodiments and the modification of the acceleration sensor 300 may be replaced by eighth to twelfth embodiments of the acceleration sensor 310 comprising two piezoelectric elements 313a and 313b mounted on both surfaces of the oscillation plate 312 in order to attain the above objects of the present invention.

The third embodiment of the acceleration sensor 300 can be modified as an eighth embodiment of the acceleration sensor 310 in a manner that the dimensions of the oscillation plate 312, the piezoelectric elements 313a and 313b and the supporting portion 311a of the fixed case member 311 are modified. The eighth embodiment of the acceleration sensor 310 as a modification of the third embodiment of the acceleration sensor 300 will be described hereinafter. The constitutional elements and parts of the eighth embodiment of the acceleration sensor 310 same as those of the third embodiment of the acceleration sensor 300 are simply represented by the same reference numerals as those of the third embodiment of the acceleration sensor 300, and will be thus omitted from description for avoiding tedious repetition.

Figure 23:
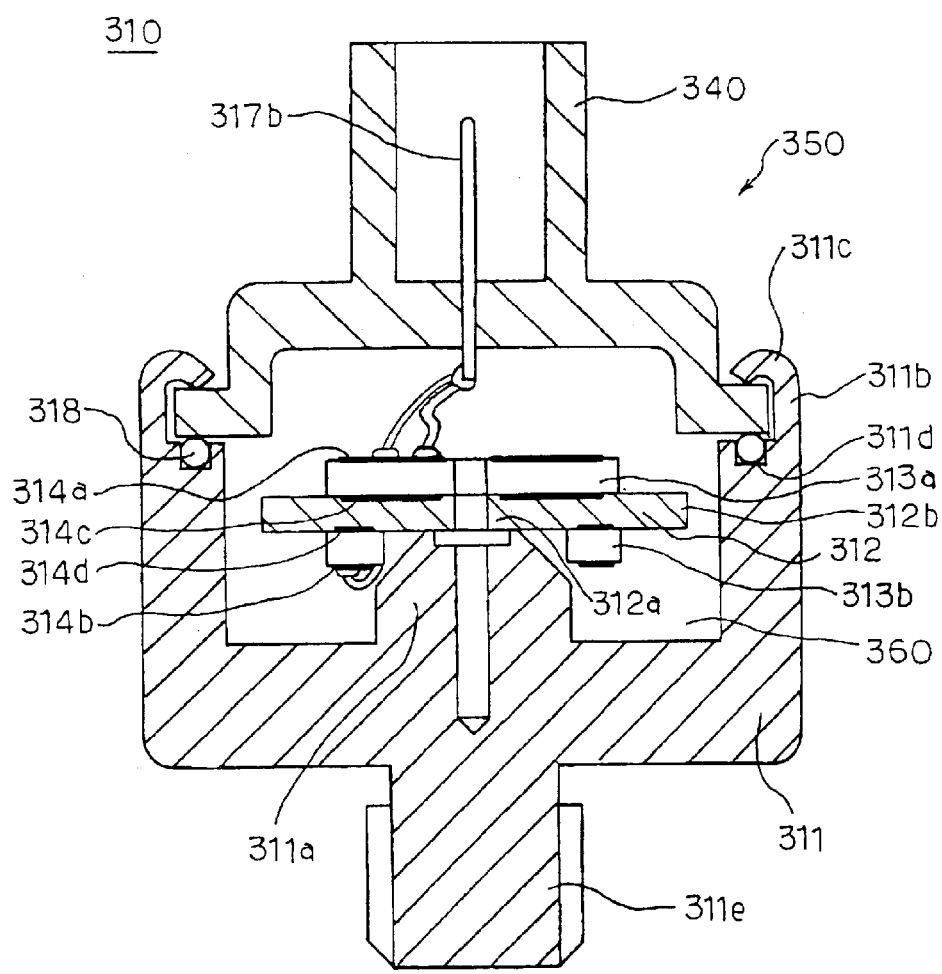
FIG. 23 is a cross-sectional view showing any one of eighth to twelfth embodiments of the acceleration sensor according to the present invention.
Figure 24:
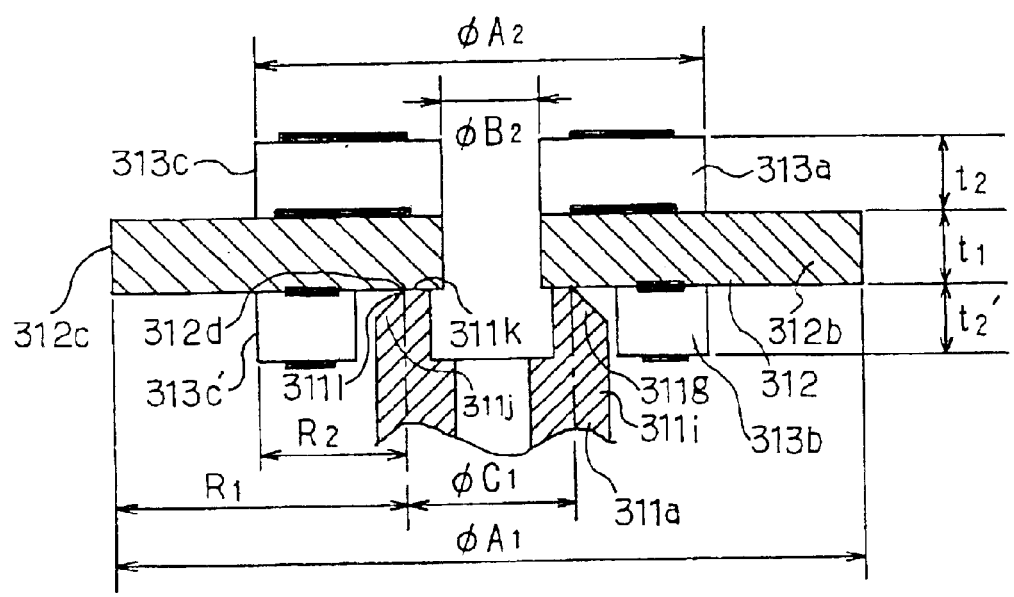
FIG. 24 is an enlarged cross-sectional view showing the constitution elements and parts forming part of the acceleration sensor shown in FIG. 23.
Figure 25:
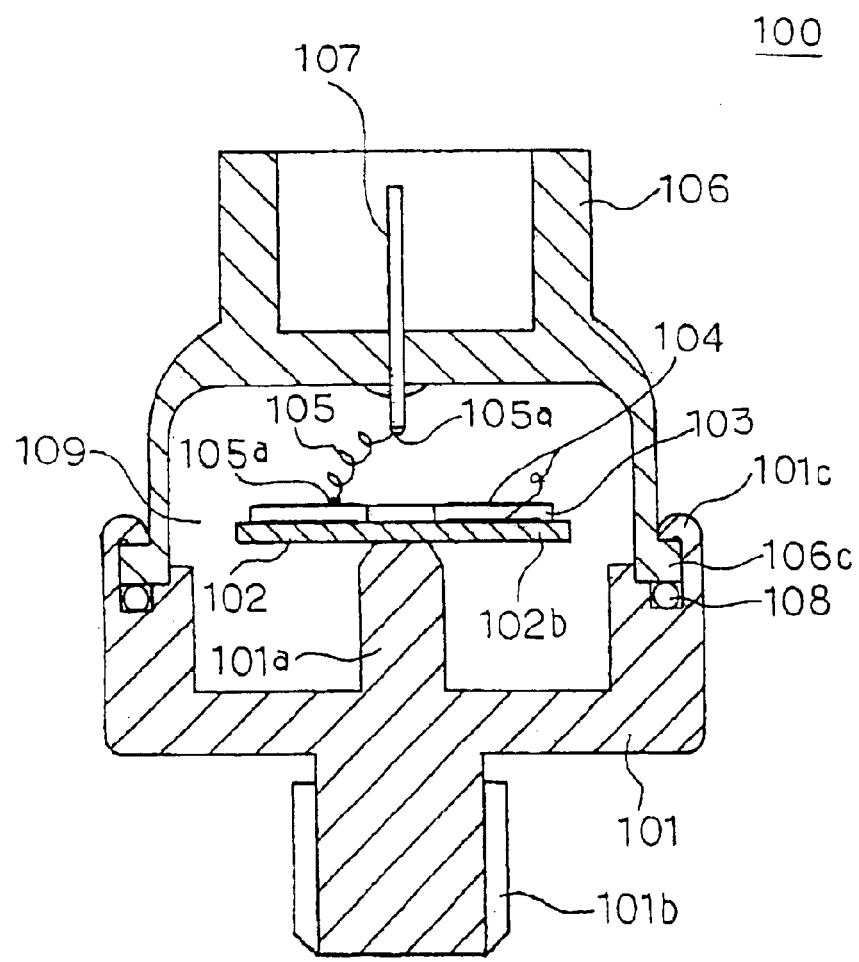
FIG. 25 is a cross-sectional view of a first conventional acceleration sensor.
Figure 26:
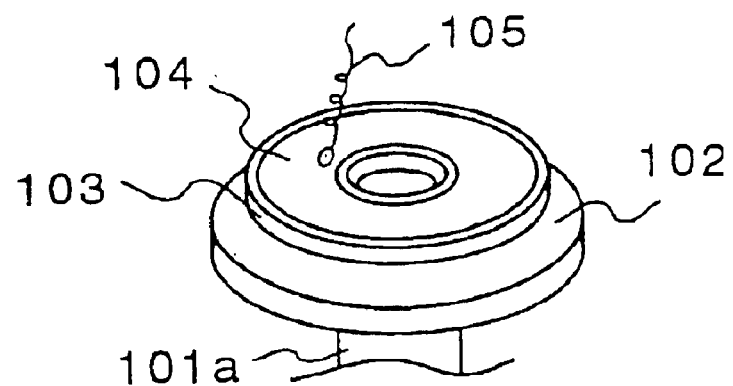
FIG. 26 is an enlarged cross-sectional view showing the constitution elements and parts forming part of the acceleration sensor shown in FIG. 25.

Referring to FIGS. 23 and 24 of the drawings, there is shown an eighth preferred embodiment of an acceleration sensor 310 according to the present invention.

The acceleration sensor 310 is shown in FIG. 23 as further comprising a first piezoelectric element 313a having flat surfaces and provided on the first flat surface of the oscillation plate 312 to generate a voltage indicative of the acceleration when the acceleration is exerted on the sensor casing 350 to have the oscillation plate 312 partly oscillated along the center axis with respect to the sensor casing 350 with the peripheral portion 312b of the oscillation plate 312 being deformed.

The eighth embodiment of the acceleration sensor 310 further comprises a second piezoelectric element 313b having flat surfaces and provided on the second flat surface of the oscillation plate 312 to generate a voltage indicative of the acceleration when the acceleration is exerted on the sensor casing 350 to have the oscillation plate 312 partly oscillated along the center axis with respect to the sensor casing 350 with the peripheral portion 312b of the oscillation plate 312 being deformed. The first and second piezoelectric elements 313a and 313b each has a pair of electrodes, i.e., first, second, third and fourth electrodes 314a, 314b, 314c, 314d having the voltage indicative of the acceleration to output therethrough. The oscillation plate 312 and the first and second piezoelectric elements 313a, 313b are adapted to be integrally oscillatable within a range of effective oscillation frequencies. The first, second, third aid fourth electrodes 314a, 314b, 314c, 314d are adapted to allow the voltage indicative of the acceleration to output therethrough.

In the acceleration sensor 310, the first piezoelectric element 313a has a third electrode 314c provided on the first surface of the first piezoelectric element 313a, and second piezoelectric element 313b has a fourth electrode 314d provided on the first surface of the second piezoelectric element 313. The fixed case member 311 and the oscillation plate 312 are each made of an electroconductive material to ensure that the third electrode 314c of first piezoelectric element 313a and the fourth electrode 314d of the second piezoelectric element 313b are electrically connected with the oscillation plate 312 and the fixed case member 311, thereby enabling the fixed case member 311 to serve as a ground.

In the eighth embodiment of the acceleration sensor 310, the oscillation plate 312 has a thickness $t_1$ (mm), and an effective oscillation radius $R_1$ (mm) measured between the inner end 312d and outer end 312c of the peripheral portion 312b of the oscillation plate 312 as shown in FIG. 24. The ratio of the effective oscillation radius $R_1$ (mm) to the thickness $t_1$ (mm) of the oscillation plate may be maintained within a fluctuation range of 3.3 plus minus 1.5, i.e., 3.3±1.5. The ground for the numeral setting is the same as that of the third embodiment of the acceleration sensor 300.

The acceleration sensor 310 thus constructed can enhance both the resonance frequency $f_0$ and the sensitivity $V_0$, thereby making it possible to improve the performance of the acceleration sensor 310.

The foregoing fourth embodiment of the acceleration sensor 300 can be replaced by a ninth embodiment of the acceleration sensor 310 comprising two piezoelectric elements 313a and 313b mounted on both surfaces of the oscillation plate 312 in order to attain the above objects of the present invention.

The fourth embodiment of the acceleration sensor 300 can be modified as a ninth embodiment of the acceleration sensor 310 in a manner that that the dimensions of the oscillation plate 312, the piezoelectric elements 313a and 313b and the supporting portion 311a of the fixed case member 311 are modified. The ninth embodiment of the acceleration sensor 310 as a modification of the fourth embodiment of the acceleration sensor 300 will be described hereinafter. The constitutional elements and parts of the ninth embodiment of the acceleration sensor 310 same as those of the acceleration sensor 300 are simply represented by the same reference numerals as those of the third embodiment of the acceleration sensor 300, and will be thus omitted from description for avoiding tedious repetition.

Referring to FIGS. 23 and 24 of the drawings, there is shown a ninth embodiment of the acceleration sensor 310 according to the present invention in the ninth embodiment of the acceleration sensor 310, the piezoelectric elements 313a and 313b has radially outer ends 313c and 313c' as shown in FIG. 24. The peripheral portion 312b of the oscillation plate 312 has a radially inner end 312d. The length between the radially outer end 313c of the piezoelectric elements 313a and the radially inner end 312d of the oscillation plate 312 and the length between the radially outer end 313c' of the piezoelectric elements 313b and the radially inner end 312d of the oscillation plate 312 are $R_2$ (mm). $R_2$ (mm) is equal to 0.5 plus minus 0.25, multiplied by $R_1$ (mm), i.e., (0.5±0.25) $R_1$. The ground for the numeral setting is the same as that of the fourth embodiment of the acceleration sensor 300.

The ninth embodiment of the acceleration sensor 310 thus constructed can enhance both the resonance frequency $f_0$ and the sensitivity $V_0$, thereby making it possible to improve the performance of the acceleration sensor 310.

The foregoing fifth embodiment of the acceleration sensor 300 can be replaced by a tenth embodiment of the acceleration sensor 310 comprising two piezoelectric elements 313a and 313b mounted on both surfaces of the oscillation plate 312 in order to attain the above objects of the present invention.

The fifth embodiment of the acceleration sensor 300 can be modified as a tenth embodiment of the acceleration sensor 310 in a manner that that the dimensions of the oscillation plate 312, the piezoelectric elements 313a and 313b and the supporting portion 311a of the fixed case member 311 are modified. The tenth embodiment of the acceleration sensor 310 as a modification of the fifth embodiment of the acceleration sensor 300 will be described hereinafter. The constitutional elements and parts of the tenth embodiment of the acceleration sensor 310 same as those of the third embodiment of the acceleration sensor 300 are simply represented by the same reference numerals as those of the third embodiment of the acceleration sensor 300, and will be thus omitted from description for avoiding tedious repetition.

Referring to FIGS. 23 and 24 of the drawings, there is shown a tenth embodiment of the acceleration sensor 310 according to the present invention. In the tenth embodiment of the acceleration sensor 310, the supporting portion 311a of the fixed case member 311 has a cylindrical section 311i and a forward tapered section 311j integrally formed with the cylindrical section 311i and in the form of a truncated cone shape as shown in FIG. 24. The forward tapered section 311j has a top surface securely held in contact with the second surface of the oscillation plate 312 and has an outer end edge 311l in axially alignment with the outer peripheral end 312c of the peripheral portion 312b of the oscillation plate 312. The outer end edge 311l has a diameter $\phi C_1$ (mm) and the piezoelectric elements 313a, 313b is in the form of an annular shape to have an inner diameter $\phi B_2$ (mm). The inner diameter $\phi B_2$ (mm) of the annular shape of the piezoelectric element 313a, 313b is approximately equal to or greater than the diameter $\phi C_1$ (mm) of the outer end edge 311l of the top surface of the supporting portion 311a. The ground for the numeral setting is the same as that of the fifth embodiment of the acceleration sensor 300.

The tenth embodiment of the acceleration sensor 310 thus constructed can enhance both the resonance frequency $f_0$ and the sensitivity $V_0$, thereby making it possible to improve the performance of the acceleration sensor 310.

The foregoing sixth embodiment of the acceleration sensor 300 can be replaced by an eleventh embodiment of the acceleration sensor 310 comprising two piezoelectric elements 313a and 313b mounted on both surfaces of the oscillation plate 312 in order to attain the above objects of the present invention.

The sixth embodiment of the acceleration sensor 300 can be modified as an eleventh embodiment of the acceleration sensor 310 in a manner that that the dimensions of the oscillation plate 312, the piezoelectric elements 313a and 313b and the supporting portion 311a of the fixed case member 311 are modified. The eleventh embodiment of the acceleration sensor 310 as a modification of the sixth embodiment of the acceleration sensor 300 will be described hereinafter. The constitutional elements and parts of the eleventh embodiment of the acceleration sensor 310 same as those of the third embodiment of the acceleration sensor 300 are simply represented by the same reference numerals as those of the third embodiment of the acceleration sensor 300, and will be thus omitted from description for avoiding tedious repetition.

Referring to FIGS. 23 and 24 of the drawings, there is shown an eleventh embodiment of the acceleration sensor 310 according to the present invention. In the eleventh embodiment of the acceleration sensor 310, the piezoelectric elements 313a and 313b have thickness $t_2$ and $t_2'$, respectively as shown in FIG. 24. The thickness $t_1$ (mm) of the oscillation plate 312 is approximately equal to the thickness $t_2$ (mm) and $t_2'$ (mm) of the piezoelectric element 313a and the piezoelectric element 313b, or the ratio of the thickness $t_1$ (mm) of the oscillation plate 312 with respect to the thickness $t_2$ of the piezoelectric element 313a and the ratio of the thickness $t_1$ (mm) of the oscillation plate 312 with respect to the thickness $t_2'$ of the piezoelectric element 313b are within a fluctuation range of 0.5 to 3. The ground for the numeral setting is the same as that of the sixth embodiment of the acceleration sensor 300.

The eleventh embodiment of the acceleration sensor 310 thus constructed can enhance both the resonance frequency $f_0$ and the sensitivity $V_0$, thereby making it possible to improve the performance of the acceleration sensor 310.

The foregoing seventh embodiment of the acceleration sensor 300 can be replaced by a twelfth embodiment of the acceleration sensor 310 comprising two piezoelectric elements 313a and 313b mounted on both surfaces of the oscillation plate 312 in order to attain the above objects of the present invention.

The seventh embodiment of the acceleration sensor 300 can be modified as a twelfth embodiment of the acceleration sensor 310 in a manner that that the dimensions of the oscillation plate 312, the piezoelectric elements 313a and 313b and the supporting portion 311a of the fixed case member 311 are modified. The twelfth embodiment of the acceleration sensor 310 as a modification of the seventh embodiment of the acceleration sensor 300 will be described hereinafter. The constitutional elements and parts of the twelfth embodiment of the acceleration sensor 310 same as those of the third acceleration sensor 300 are simply represented by the same reference numerals as those of the third embodiment of the acceleration sensor 300, and will be thus omitted from description for avoiding tedious repetition.

Referring to FIGS. 23 and 24 of the drawings, there is shown an twelfth embodiment of the acceleration sensor 310 according to the present invention. In the twelfth acceleration sensor 310, the oscillation plate 312 and the piezoelectric elements 313a and 313b are integrally oscillatable in two different modes consisting of: a 1/1 oscillation mode where the oscillation plate 312 is irregularly deformed to have the peripheral portion 312b oscillated with a single vector in the oscillation direction of the oscillation plate 312 when the oscillation plate 312 is oscillated with respect to the fixed case member 311 at a resonance frequency $f_0$ (see FIG. 31A); and a 1/2 oscillation mode where the oscillation plate 312 is irregularly deformed to have two different half parts of the peripheral portion 312b oscillated with their respective different vectors opposite to each other in the oscillation direction of the oscillation plate 312 when the oscillation plate 312 is oscillated with respect to the fixed case member 311 at a noise frequency $f_0 1$ (see FIG. 31B), and the resonance frequency $f_0$ and the noise frequency $f_0 1$ are out of the range of effective oscillation frequencies. The 1/1 oscillation mode and 1/2 oscillation mode are hereinlater referred to as "the first oscillation mode" and "the second oscillation mode", respectively. The ground for the definition is the same as that of the seventh embodiment of the acceleration sensor 300.

The acceleration sensor 310 thus constructed can enhance both the resonance frequency $f_0$ and the sensitivity $V_0$, thereby making it possible to improve the performance of the acceleration sensor 310.

The following description will be directed to how to determine the dimensions of the constitution elements and parts forming port of the seventh embodiment of the acceleration sensor 300.

As shown in FIG. 24, the supporting portion 311a of the fixed case member 311 of the acceleration sensor 300 has a cylindrical section 311i and a forward tapered section 311j integrally formed with the cylindrical section 311i and in the form of a truncated cone shape. The forward tapered section 311j has a top surface 311k securely held in contact with the second surface of the oscillation plate 312 and has an outer end edge 311l in axially alignment with the outer peripheral end 312c of the peripheral portion 312b of the oscillation plate 312. The outer end edge 311l has a diameter $\phi C_1$ (mm), and the oscillation plate 312 has an effective oscillation radius $R_1$ (mm) measured between the inner end 312d and outer end 312c of the peripheral portion 312b of the oscillation plate 312.

The oscillation plate 312 and the piezoelectric elements 313a and 313b are adapted to be integrally oscillatable in the first and second oscillation modes with $\phi C_1$ (mm)/$R_1$ (mm) and $f_0 1/f_0$ given in the following equations:

$$\phi C_1 \text{ (mm)}/R_1 \text{ (mm)} \geq 0.92, \text{ and} \qquad \text{equation (2)}$$

$$f_0 1/f_0 \geq 0.52 \qquad \text{equation (3)}$$

The ground for the definition is the same as that of the seventh embodiment of the acceleration sensor 300.

The acceleration sensor 310 thus constructed makes it possible for the supporting portion 311a to steadily support steadily the oscillation plate 312 and the piezoelectric elements 313a and 313b to prevent the oscillation plate 312 and the piezoelectric elements 313a and 313b from oscillating in the second oscillation mode, i.e., the 1/2 oscillation mode at a frequency in the range of effective oscillation frequencies actually used for detecting an acceleration. This means that the noise frequency $f_0 1$ can be moved out of the range of effective oscillation frequencies actually used for detecting an acceleration. This means that the acceleration sensor 310 thus constructed can enhance both the resonance frequency $f_0$ and the sensitivity $V_0$, thereby making it possible to improve the performance of the acceleration sensor 310.

As will be seen from the foregoing description, the acceleration sensor 310 according to the present invention is of high performance and can be produced at a low cast. The reason is due to the fact that the fixed case member 311 and the cover assembly 340 define a closed space 360 accommodating the oscillation plate 312 and the piezoelectric elements 313a and 313b received therein, and the oscillation plate 312 and the piezoelectric elements 313a and 313b are oscillatably supported by the supporting portion 311a formed on the central bottom portion of the fixed case member 311, and the first and second electrodes 314a and 314b of the piezoelectric elements 313a and 313b are electrically connected with the exterior connector through the terminal pin 317b, thereby reducing the number of the constitutional elements and parts and facilitating the automatic assembly. Furthermore, the oscillation plate 312 and the piezoelectric elements 313a and 313b are adapted to be integrally oscillatable in the first and second oscillation modes with $\phi C_1$ (mm)/$R_1$ (mm) and $f_0 1/f_0$ given in the following equations: $\phi C_1$ (mm)/$R_1$ (mm)$\geq 0.92$, and $f_0 1/f_0 \geq 0.5$, thereby making it possible for the noise frequency $f_0 1$ to be moved out of the range of effective oscillation frequencies actually used for detecting an acceleration It will be apparent to those skilled in the art and it is contemplated that variations and/or changes in the embodiments illustrated and described herein may be without departure from the present invention. Accordingly, it is intended that the foregoing description is illustrative only, not limiting, and that the true spirit and scope of the present invention will be determined by the appended claims.

What is claimed is:

1. An acceleration sensor for detecting an acceleration caused by an object oscillated in an oscillation direction, comprising:

a sensor casing having a center axis and to be positioned in coaxial alignment with said oscillation direction to receive said acceleration, said sensor casing including a cylindrical fixed case member having a supporting portion axially extending, and a cover assembly provided on said fixed case member to cover said fixed case member to define a closed space, an oscillation plate accommodated in said closed space of said sensor casing and having a central portion supported by said supporting portion of said fixed case member, and a peripheral portion integrally formed with said central portion and extending radially outwardly of said central portion to be freely movable with respect to said supporting portion of said fixed case member, and said oscillation plate being partly oscillatable along said center axis with respect to said fixed case member;

a piezoelectric element held in contact with said oscillation plate to generate a voltage indicative of said acceleration when said acceleration is exerted on said sensor casing to have said oscillation plate partly oscillated along said center axis with respect to said sensor casing with said peripheral portion of said oscillation plate being deformed, and said piezoelectric element having first and second surfaces respectively having first and second electrodes mounted thereon to have said voltage indicative of said acceleration to output therethrough;

a terminal pin extending through said cover assembly and terminating at the a printed board retained by said cover assembly to have said second electrode of said piezoelectric element and said terminal pin connected with each other, and in which said oscillation plate has a thickness $t_1$ and an radius $R_1$, said piezoelectric element has a thickness $t_2$, and a radius $R_2$, said radius $R_1$ of said oscillation plate divided by said thickness $t_1$ of said oscillation plate is approximately equal to 3.3, said radius $R_2$ of said piezoelectric element divided by said radius $R_1$ of said oscillation plate is approximately equal to 0.5, and thickness $t_1$ of said oscillation plate divided by said thickness $t_2$, of said piezoelectric element is approximately equal to 1.

2. An acceleration sensor for detecting an acceleration as set forth in claim 1, in which said fixed case member and said oscillation plate are each made of an electroconductive material to ensure that said first electrode is electrically connected with said oscillation plate and said fixed case member, said cover assembly comprises a metal base member made of an electroconductive material and a cover member made of an insulating material, said metal base member having a peripheral end portion welded to part of said fixed case member with said closed space defined by said metal base member and said fixed case member, said cover member being mounted on said metal base member with said printed board interposed between said metal base member and said cover member, and said terminal pin extending through said metal base member, said printed board, and said cover member are electrically connected with said second electrode of said piezoelectric element.

3. An acceleration sensor for detecting an acceleration caused by an object oscillated in an oscillation direction, comprising:

a sensor casing having a center axis and to be positioned in coaxial alignment with said oscillation direction to receive said acceleration, said sensor casing including a cylindrical fixed case member having a supporting portion axially extending, and a cover assembly provided on said fixed case member to cover said fixed case member to define a closed space, an oscillation plate accommodated in said closed space of said sensor casing and having a central portion supported by said supporting portion of said fixed case member, and a peripheral portion integrally formed with said central portion and extending radially outwardly of said central portion to be freely movable with respect to said supporting portion of said fixed case member, and said oscillation plate being partly oscillatable along said center axis with respect to said fixed case member;

a piezoelectric element held in contact with said oscillation plate to generate a voltage indicative of said acceleration when said acceleration is exerted on said sensor casing to have said oscillation plate partly oscillated along said center axis with respect to said sensor casing with said peripheral portion of said oscillation plate being deformed, and said piezoelectric element having first and second surfaces respectively having first and second electrodes mounted thereon to have said voltage indicative of said acceleration to output therethrough;

first and second terminal pins extending through said cover assembly and terminating at the exterior of said cover assembly, and a printed board retained by said cover assembly to have said electrodes of said piezoelectric element and said terminal pins connected with each other, and in which said oscillation plate has a thickness $t_1$ and an radius $R_1$, said piezoelectric element has a thickness $t_2$, and a radius $R_2$, said radius $R_1$ of said oscillation plate divided by said thickness $t_1$ of said oscillation plate is approximately equal to 3.3, said radius $R_2$ of said piezoelectric element divided by said radius $R_1$ of said oscillation plate is approximately equal to 0.5, and thickness $t_1$ of said oscillation plate divided by said thickness $t_2$, of said piezoelectric element is approximately equal to 1.

4. An acceleration sensor for detecting an acceleration as set forth in claim 3, in which said fixed case member and said oscillation plate are each made of an electroconductive material to ensure that said first electrode is electrically connected with said oscillation plate and said fixed case member, said cover assembly comprises a metal base member made of an electroconductive material and a cover member made of an insulating material, said metal base member having a peripheral end portion welded to part of said fixed case member with said closed space defined by said metal base member and said fixed case member, said cover member being mounted on said metal base member with said printed board interposed between said metal base member and said cover member, said first terminal pin extending through said metal base member, said printed board and said cover member to be electrically connected with said first electrode of said piezoelectric element by way of said fixed case member, said metal base member and said printed board, and said second terminal pin extending through said metal base member, said printed board and said cover member to be electrically connected directly with said second electrode of said piezoelectric element.

5. An acceleration sensor for detecting an acceleration as set forth in claim 2, in which said metal base member is formed with a central hole, and said terminal pin having a contacting rod portion projecting from said printed board and extending through said central hole of said metal base member to project into said closed space in electrical connection with said second electrode of said piezoelectric element.

6. An acceleration sensor for detecting an acceleration as set forth in claim 1 or claim 3, in which said printed board has a signal processing circuit.

7. An acceleration sensor for detecting an acceleration as set forth in claim 1 or claim 3, in which said cover member has a first surface firmly held in contact with said metal base member and a second surface open to the atmosphere, and said fixed case member has a large diameter portion, a small diameter portion, and an annular ledge portion having said large and small diameter portions integrally formed with each other to have the peripheral end portion of said metal base member mounted thereon and welded thereto, said small diameter portion having an open peripheral edge inwardly bent to be firmly engaged with said second surface of said cover member.

8. An acceleration sensor for detecting an acceleration as set forth in claim 1 or claim 3, in which said cover member is smaller in diameter than said metal base member to form an annular gap between the inner surface of said small diameter portion of said fixed case member and the outer peripheral end surface of said cover member, and which further comprises a resilient ring disposed in said annular gap and rested on said metal base member to have said closed space hermetically sealed.

9. An acceleration sensor for detecting an acceleration as set forth in claim 8, in which said resilient ring is made of an O-ring.

10. An acceleration sensor for detecting an acceleration as set forth in claim 1 or claim 3, in which said cover member is formed with a circular recess having said printed board received therein, and an annular groove open to said circular recess, said metal base member is formed with an annular projection extending through said printed board and snugly received in said annular groove of said cover member to have said cover member positioned with respect to said metal base member with said printed board positioned interposed between said cover member and said metal base member.

11. An acceleration sensor for detecting an acceleration as set forth in claim 1 or claim 3, in which said fixed case member has a screw portion to be screwed to an exterior object which is to receive said acceleration.

* * * * *

UNITED STATES PATENT AND TRADEMARK OFFICE
CERTIFICATE OF CORRECTION

PATENT NO. : 6,925,878 B2
DATED : August 9, 2005
INVENTOR(S) : Hiroyuki Baba et al.

It is certified that error appears in the above-identified patent and that said Letters Patent is hereby corrected as shown below:

Column 29,
Line 42, delete "311 a is", and insert -- 311a is --.

Column 33,
Line 34, delete ">", and insert -- $\geq$ --.

Column 41,
Line 30, after "the", insert -- exterior of said cover assembly, and --.

Signed and Sealed this

Seventh Day of March, 2006

JON W. DUDAS
*Director of the United States Patent and Trademark Office*